United States Patent
Iwami

(10) Patent No.: US 12,032,346 B2
(45) Date of Patent: Jul. 9, 2024

(54) CONTROL SYSTEM AND CONTROL DEVICE

(71) Applicant: OMRON Corporation, Kyoto (JP)

(72) Inventor: Kenichi Iwami, Sakai (JP)

(73) Assignee: OMRON Corporation, Kyoto (JP)

( * ) Notice: Subject to any disclaimer, the term of this patent is extended or adjusted under 35 U.S.C. 154(b) by 573 days.

(21) Appl. No.: 17/286,487

(22) PCT Filed: Oct. 24, 2019

(86) PCT No.: PCT/JP2019/041736
§ 371 (c)(1),
(2) Date: Apr. 19, 2021

(87) PCT Pub. No.: WO2020/105358
PCT Pub. Date: May 28, 2020

(65) Prior Publication Data
US 2021/0389741 A1    Dec. 16, 2021

(30) Foreign Application Priority Data

Nov. 19, 2018  (JP) .................................. 2018-216587

(51) Int. Cl.
*G05B 19/042*    (2006.01)
*G05B 19/05*    (2006.01)
*G06F 13/28*    (2006.01)

(52) U.S. Cl.
CPC ......... *G05B 19/042* (2013.01); *G05B 19/054* (2013.01); *G06F 13/28* (2013.01); *G05B 2219/15056* (2013.01)

(58) Field of Classification Search
CPC .................................................. G07F 17/3293
See application file for complete search history.

(56) References Cited

U.S. PATENT DOCUMENTS

| 7,072,996 B2 * | 7/2006 | Adusumilli ......... G06F 13/4031 710/308 |
| 7,689,732 B2 * | 3/2010 | Chen ....................... G06F 13/28 710/22 |

(Continued)

FOREIGN PATENT DOCUMENTS

| JP | H0512181 | 1/1993 |
| JP | H11353269 | 12/1999 |

(Continued)

OTHER PUBLICATIONS

"Search Report of Europe Counterpart Application", issued on Jul. 20, 2022, p. 1-p. 8.

(Continued)

*Primary Examiner* — Henry Tsai
*Assistant Examiner* — Juanito C Borromeo
(74) *Attorney, Agent, or Firm* — JCIPRNET

(57) ABSTRACT

A control system includes one or a plurality of functional units, and a control device for exchanging communication data transmitted circularly among the functional units. The control device selects, in accordance with an instruction from a user or in accordance with a predetermined condition, one transfer system of a first transfer system in which a computation processing unit transfers the communication data and a second transfer system in which a DMA controller transfers the communication data.

13 Claims, 14 Drawing Sheets

(56) References Cited

U.S. PATENT DOCUMENTS

2012/0290745 A1* 11/2012 Shinohara ............... G06F 13/28
 710/22
2014/0012402 A1 1/2014 Nishiyama et al.

FOREIGN PATENT DOCUMENTS

| JP | 2016194823 | 11/2016 |
| JP | 2018129614 | 8/2018 |

OTHER PUBLICATIONS

"International Search Report (Form PCT/ISA/210) of PCT/JP2019/041736," mailed on Jan. 28, 2020, with English translation thereof, pp. 1-4.
"Written Opinion of the International Searching Authority (Form PCT/ISA/237) of PCT/JP2019/041736," mailed on Jan. 28, 2020, with English translation thereof, pp. 1-8.

* cited by examiner

CONTROL SYSTEM AND CONTROL DEVICE

CROSS-REFERENCE TO RELATED APPLICATION

This application is a 371 application of the International PCT application serial no. PCT/JP2019/041736, filed on Oct. 24, 2019, which claims the priority benefits of Japan Patent Application No. 2018-216587, filed on Nov. 19, 2018. The entirety of each of the above-mentioned patent applications is hereby incorporated by reference herein and made a part of this specification.

TECHNICAL FIELD

The present invention relates to selection of a transfer system for transmitting communication data to a storage unit.

BACKGROUND ART

In production fields or the like in which factory automation (FA) is used, industrial control devices such as programmable controllers (PLC) or robot controllers have been produced. Control devices and functional units are electrically connected via communication lines. The functional units exchange communication data transmitted circularly via the communication lines with the control devices. The communication data is temporarily stored in buffers of communication circuits included in the control devices. The communication data is transmitted from the buffers to storage units included in the control devices. The communication data is transmitted in accordance with, for example, a direct memory access (DMA) transfer system (hereinafter also referred to as a "DMA system"). The DMA system is a system in which a DMA controller connected to a communication circuit transmits communication data to a storage unit.

With regard to transmission of communication data by a control device, Japanese Patent Laid-Open No. 2018-129614 (Patent Literature 1) discloses a technology realized in such a manner that a DMA controller is disposed between a computation processing unit that includes a processor executing a task and a main memory and a communication circuit that performs communication via a local bus in a CPU unit included in a PLC; the DMA controller includes a plurality of DMA cores and the DMA cores sequentially perform processes designated in a descriptor table; and thus various communication processes such as an IO refresh process between a control device (the processor) and functional units in addition to data transmission between the computation processing unit and the communication circuit can be realized at a high speed (see [paragraph 0143]).

CITATION LIST

Patent Literature

[Patent Literature 1]
Japanese Patent Laid-Open No. 2018-129614

SUMMARY OF INVENTION

Technical Problem

Incidentally, when a control device transmits communication data using a certain transfer system (for example, the DMA system), a time necessary for the transmission is longer in some cases depending on the size of the communication data (a data amount) than when the communication data is transmitted using another transfer system. Accordingly, it is necessary to disclose a technology capable of selecting an optimum transfer system in accordance with a data amount.

The present invention has been devised in such circumstances and provides a technology capable of selecting an optimum transfer system in accordance with a data amount.

Solution to Problem

According to an aspect of the present invention, a control system includes one or a plurality of functional units; and a control device configured to exchange communication data transmitted circularly among the one or plurality of functional units. The control device includes a communication circuit including a first storage unit that temporarily stores the communication data, a second storage unit that stores the communication data transmitted from the first storage unit in accordance with one of a plurality of transfer systems, a computation processing unit that performs a computation process using the communication data stored in the second storage unit, and a DMA controller connected to the computation processing unit and the communication circuit. The plurality of transfer systems includes a first transfer system in which the computation processing unit transfers the communication data and a second transfer system in which the DMA controller transfers the communication data. The computation processing unit selects one transfer system between the first and second transfer systems in accordance with an instruction from a user or a predetermined condition.

In this configuration, the control system can select an optimum transfer system in accordance with the data amount during an operation of a system.

The computation processing unit may measure a first transfer time and a second transfer time, wherein the first transfer time is one between a time in which the communication data is transmitted to the second storage unit in accordance with the first transfer system, and the time in which the communication data is transmitted and a time in which the computation process is performed, and the second transfer time is one between a time in which the communication data is transmitted to the second storage unit in accordance with the second transfer system, and the time in which the communication data is transmitted and the time in which the computation process is performed, and may output measurement data including the first transfer time and the second transfer time.

In this configuration, the control system can measure either the time of the transfer process for the communication data in each transfer system or a time including the transfer process and the computation process for the communication data.

The computation processing unit may measure the first transfer time and the second transfer time when supply of power to the control device starts or a configuration of the one or plurality of functional units connected to the control device is changed.

In this configuration, the control system can measure the transfer time at a timing at which a transfer system different from a presently set transfer system can be selected during an operation of a system.

The measurement data may include a first average transfer time for the first transfer time when the communication data is transferred a plurality of times in accordance with the first transfer system and a second average transfer time for the second transfer time when the communication data is transferred a plurality of times in accordance with the second transfer system. The computation processing unit may be able to select a transfer system in which the communication data is transferred for a shorter time between the first transfer system in which the communication data is transferred for the first average transfer time and the second transfer system in which the communication data is transferred for the second average transfer time.

In this configuration, the control system can select a transfer system in which the time in which the communication data is transferred to the storage unit is shorter during an operation of a system, and thus it is possible to shorten a time necessary for the process at the constant period.

The measurement data may include a degree of variation in the first transfer time when the communication data is transferred a plurality of times in accordance with the first transfer system and a degree of variation in the second transfer time when the communication data is transferred a plurality of times in accordance with the second transfer system. The computation processing unit may be able to select a transfer system in which the communication data is transferred to a degree of less variation between the first transfer system in which the communication data is transferred to the degree of variation in the first transfer time and the second transfer system in which the communication data is transferred to the degree of variation in the second transfer time.

In this configuration, the control system can select a transfer system in which the variation in the time of the transfer of the communication data to the storage unit is small, and thus it is possible to reliably end the process at the constant period.

The control system may further include a support device configured to receive the measurement data. The support device includes a display unit that displays an image in which a maximum time allowed for the transfer of the communication data is able to be compared to an actually measured time when the communication data is transferred in accordance with one transfer system between the first and second transfer systems, based on the received measurement data.

In this configuration, the control system can display an image with which a user can intuitively determine which transfer system is suitable for a system among the plurality of transfer systems.

According to another aspect of the present invention, a control device exchanges communication data transmitted circularly among one or a plurality of functional units. The control device includes: a communication circuit including a first storage unit that temporarily stores the communication data; a second storage unit configured to store the communication data transmitted from the first storage unit in accordance with one of a plurality of transfer systems; a computation processing unit configured to perform a computation process using the communication data stored in the second storage unit; and a DMA controller connected to the computation processing unit and the communication circuit. The plurality of transfer systems includes a first transfer system in which the computation processing unit transfers the communication data and a second transfer system in which the DMA controller transfers the communication data. The computation processing unit selects one transfer system between the first and second transfer systems in accordance with an instruction from a user or a predetermined condition.

In this configuration, the control device can select an optimum transfer system in accordance with the data amount during an operation of a system.

Advantageous Effects of Invention

According to the present invention, it is possible to select an optimum transfer system in accordance with a data amount.

DESCRIPTION OF EMBODIMENTS

Figure 1:
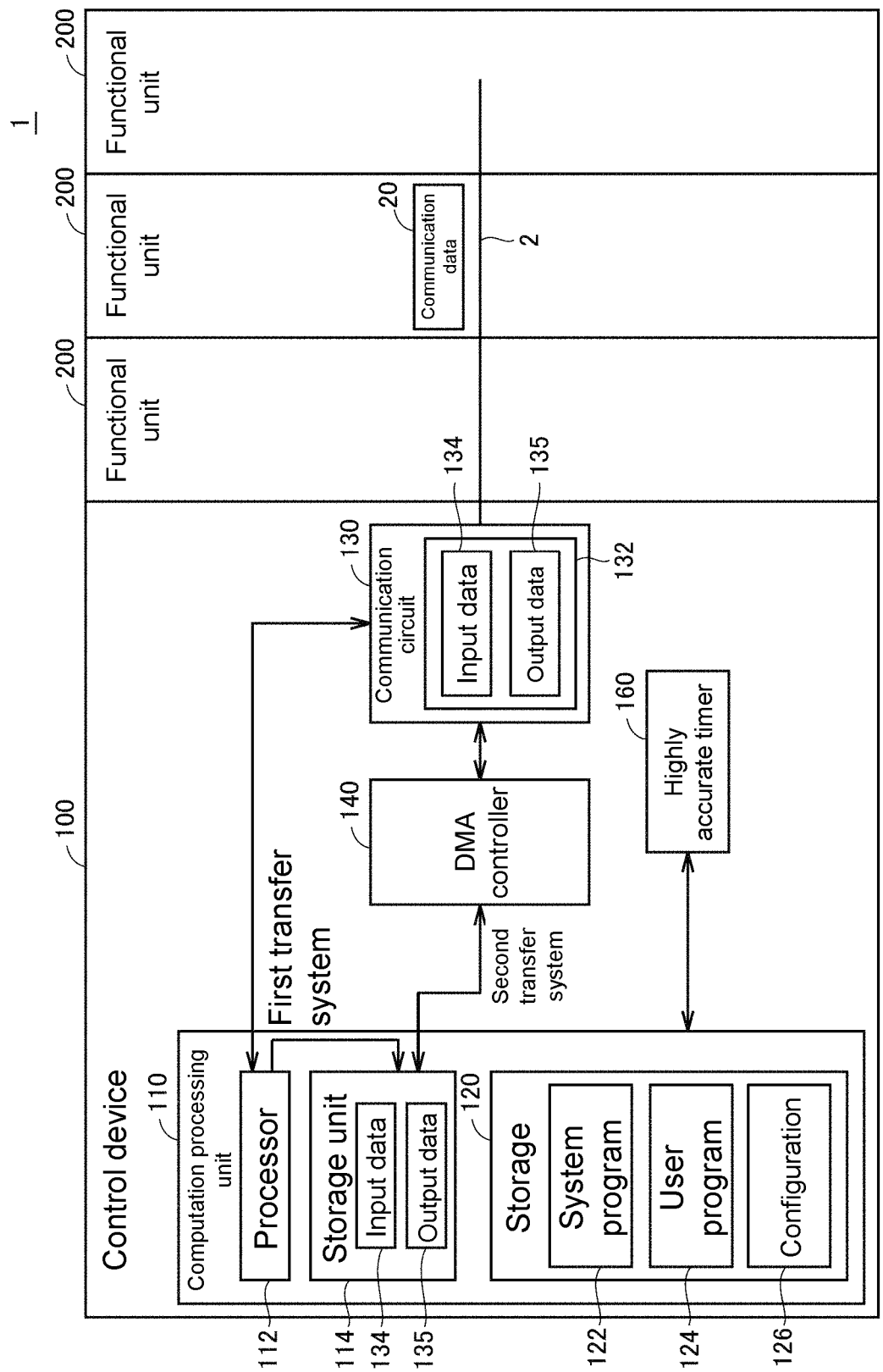
FIG. 1 is a schematic diagram illustrating a configuration of main units of a PLC according to a first embodiment.

Hereinafter, embodiments of the present invention will be described with reference to the drawings. In the following description, the same reference numerals are given to the same components. The same goes for names and functions. Accordingly, detailed description of these will not be repeated.

In the following description, a programmable controller (PLC) which is a representative example of a "control system" will be described as a specific example, but technical ideas disclosed in the present specification can be applied to any control device without being limited to the term PLC.

First Embodiment

[1. Device Configuration of PLC 1]

First, a device configuration of a PLC according to a first embodiment will be described. FIG. 1 is a schematic diagram illustrating a configuration of main units of the PLC according to the first embodiment. Referring to FIG. 1, a PLC 1 according to the first embodiment typically includes a control device 100 and one or a plurality of functional units 200. The control device 100 is an element included in the PLC 1 and corresponds to a computation unit that controls processing of the entire PLC 1. The functional units 200 provide various functions of realizing control of various machines or facilities in the PLC 1. The control device 100 and the one or plurality of functional units 200 are connected via a local bus 2 which is an example of a communication line. For example, a configuration of a type of daisy-chain is adopted as the local bus 2.

In the configuration illustrated in FIG. 1, the control device 100 functions as a communication unit or a communication device. More specifically, the control device 100 may function as a master communication unit that manages general communication in the local bus 2 or may function as a slave communication unit that causes each functional unit 200 to perform communication under management of the control device 100. By adopting the master/slave configuration, it is possible to easily control timings or the like of communication data (communication frames) 20 circulated in the local bus 2.

The control device 100 includes a computation processing unit 110, a communication circuit 130, a DMA controller 140, and a highly accurate timer 160. A communication unit that provides a function of the communication circuit 130 may be configured to be combined with the control device 100 including the computation processing unit 110.

The computation processing unit 110 includes a processor 112, a storage unit 114, and a storage 120. To facilitate description, in FIG. 1, only one processor 112 is drawn, but a plurality of processors may be mounted. Each processor may have a plurality of cores. In the computation processing unit 110, the processor 112 periodically performs one or a plurality of tasks. When a plurality of tasks is performed by the computation processing unit 110, different priorities may be set in the plurality of tasks.

The processor 112 transmits communication data 20 (for example, input data 134) stored in a buffer 132 of the communication circuit 130 to be described below to the storage unit 114. The processor 112 transmits the communication data 20 to the storage unit 114 in accordance with, for example, a data transfer system of a programmed input/output (PIO) transfer system (hereinafter also referred to a "PIO system") to be described below among a plurality of transfer systems used to transfer data.

The storage unit 114 is configured by a dynamic random access memory (DRAM), a static random access memory (SRAM), or the like and provides a work area necessary for the processor 112 to execute a program.

The storage 120 is configured by a flash memory, a hard disk, or the like and stores a system program 122, a user program 124, a configuration 126, and the like.

The system program 122 includes an operating system (OS) and a library used for the processor 112 to execute the user program 124. The system program 122 includes a task for transmitting a field value (input data) included in the communication data 20 circulated among the functional units 200 to the control device 100. Hereinafter, the field value is referred to as input data 134. The system program 122 includes a task for transmitting a control instruction value computed by the control device 100 to the functional unit 200. Hereinafter, the control instruction value is referred to as output data 135. In this way, the system program 122 includes a task for periodically performing a process of transmitting at least one of the input data 134 and the output data 135 (an IO refresh process to be described below). The user program 124 is generated arbitrarily in accordance with a control target machine or facility. The system program 122 includes a task for performing a process of measuring a data transfer time in each transfer system among a plurality of data transfer systems.

The configuration 126 includes various setting values necessary to execute a program in the control device 100 or various setting values for defining a network configuration. The configuration 126 includes, for example, a data amount of the input data 134 and the output data 135 transmitted and received in the IO refresh process.

The communication circuit 130 exchanges the communication data 20 with the one or plurality of functional units 200 via the local bus 2 which is a communication line. That is, the communication circuit 130 takes charge of transmitting and receiving the communication data 20 via the local bus 2 which is a communication line. The communication circuit 130 includes a buffer 132. The buffer 132 temporarily stores the communication data 20 transmitted and received via the local bus 2. The communication data 20 temporarily stored in the buffer 132 is, for example, the input data 134 and the output data 135.

The transmission and reception of the communication data 20 performed by the communication circuit 130 are realized as follows, for example. The communication circuit 130 is physically connected to the local bus 2 and generates an electrical signal in accordance with an instruction from the DMA controller 140. The communication circuit 130 transmits the communication data 20 to the local bus 2, demodulates the electrical signal occurring on the local bus 2, and outputs the communication data 20 to the computation processing unit 110.

In the present specification, the "IO refresh process" includes at least one of transmission of the input data 134 to the control device 100 or the like and transmission of the output data 135 to the functional unit 200. The input data 134 is data collected by the functional unit 200. The output data 135 is data stored in the storage unit 114 of the control device 100. That is, the term "IO refresh process" is used for convenience and can include a process of updating only one of the input data 134 and the output data 135 (for example, only the input data 134).

The DMA controller 140 is connected to the computation processing unit 110 and the communication circuit 130 and has a function of relaying a request between the computation processing unit 110 and the communication circuit 130 and accelerating data access. The DMA controller 140 transmits the communication data 20 (for example, the input data 134) stored in the buffer 132 of the communication circuit 130 to the storage unit 114. The DMA controller 140 transmits the communication data 20 to the storage unit 114 in accordance with, for example, a data transfer system of DMA transmission to be described below (hereinafter also referred to as a "DMA system") among a plurality of data transfer systems used to transmit data.

For example, the DMA controller 140 gives an instruction to the communication circuit 130 in response to a communication request from the processor 112 and transmits the input data 134 stored in the buffer 132 of the communication circuit 130 to the storage unit 114. The DMA controller 140 transmits the output data 135 stored in the storage unit 114 to the communication circuit 130 in response to the communication request from the processor 112. When at least main units of the DMA controller 140 have hardware configurations, high-speed processing can be realized than the processor 112. Typically, the DMA controller 140 is realized using a hardware logic. For example, the DMA controller 140 may be mounted using a field-programmable gate array (FPGA) which is an example of a programmable logic device (PLD), an application specific integrated circuit (ASIC) which is an example of an integrated circuit (IC), or the like.

The highly accurate timer 160 is a type of clock for determining a timing between the control device 100 and another unit connected to the control device 100 and is realized using a counter or the like that counts up at a predetermined period.

The communication data 20 is used for the IO refresh process. The communication data 20 is transmitted circularly among the plurality of functional units 200 via the local bus 2. During a period in which the communication data 20 is not transmitted, the communication data 20 is transmitted as a message between the control device 100 and any functional unit 200 or the plurality of functional units 200.

Any program can be used as a protocol for exchanging data on the local bus 2. Further, the local bus 2 is exemplified as an example of a communication line, but the present invention is not limited thereto and any constant period network may be adopted. As the constant period network, a known network such as EtherCAT (registered trademark), EtherNet/IP (registered trademark), DeviceNet (registered trademark), or CompoNet (registered trademark) may be adopted.

In the configuration illustrated in FIG. 1, to facilitate the description, the configuration in which the computation processing unit 110, the communication circuit 130, and the DMA controller 140 are distinguished is illustrated, but the present invention is not limited thereto. Any mounting form can be adopted. For example, a system on chip (Soc) in which a part or all of the computation processing unit 110 or a part or all of the communication circuit 130 is mounted on the same chip may be configured. Alternatively, an SoC in which main functions of the processor 112 of the computation processing unit 110 and the DMA controller 140 are mounted on the same chip may be used. This mounting form is appropriately selected in consideration of required performance, cost, or the like.

The functional unit 200 can typically include an I/O unit, a communication unit, a temperature adjustment unit, and an identifier (ID) sensor unit. Examples of the I/O unit include a digital input (DI) unit, a digital output unit (DU), an analog output (AI) unit, an analog output (AO) unit, a pulse catch input unit, and a multiple unit (a plurality of kinds of units are mixed).

The control device 100 relays exchange of data with another PLC, a remote I/O device, and a functional unit. The control device 100 can include a communication device or the like related to a protocol of, for example, EtherCAT (registered trademark), EtherNet/IP (registered trademark), DeviceNet (registered trademark), or CompoNet (registered trademark).

The temperature adjustment unit is a control device that has an analog input function of acquiring a temperature measurement value or the like, an analog output function of outputting a control instruction or the like, and a proportional integral differential (PID) control function. The ID sensor unit is a device that reads data from a radio frequency Identifier (RFID) or the like in a contactless manner.

The functional unit 200 processes the communication data 20 transmitted circularly on the local bus 2. More specifically, when the communication processing unit 210 receives the certain communication data 20 via the local bus 2, a communication frame is transmitted to the functional unit 200 located next on the local bus 2 after data writing and/or data reading of the received communication data 20 is performed as necessary. The functional unit 200 provides a function of the frame relay. The functional unit 200 simply transmits a communication frame which is not a communication unit destinated for the own functional unit 200 to the functional unit 200 located next.

[2. Periodic Task in Control Device 100]

The PLC 1 according to the first embodiment performs one or a plurality of periodic tasks in which priorities are set. Of the periodic tasks, as one task with the highest priority (hereinafter also referred to as a "primary periodic task"), there is the above-described IO refresh process. As tasks with priorities lower than the priority of the IO refresh process, there are various tasks (hereinafter also referred to as "normal periodic tasks"). These tasks are performed repeatedly at preset constant periods.

Figure 2:
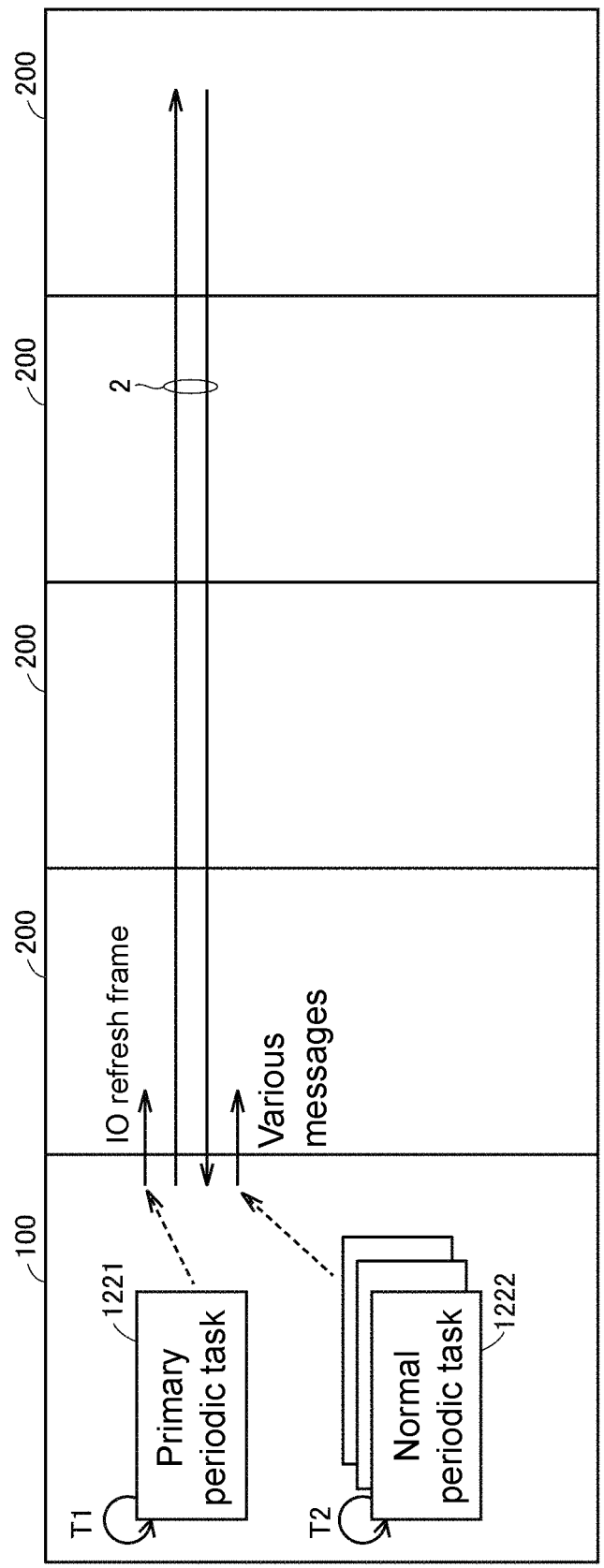
FIG. 2 is a schematic diagram illustrating execution of periodic tasks in the PLC.

FIG. 2 is a schematic diagram illustrating execution of periodic tasks in the PLC 1. Referring to FIG. 2, a primary periodic task 1221 for performing the IO refresh process or the like is repeatedly performed at a control period T1 in the control device 100. The primary periodic task 1221 is repeatedly performed and one or a plurality of normal periodic tasks 1222 with priorities lower than the priority of the primary periodic task 1221 are repeatedly performed at a control period T2. The control period T2 of the normal periodic tasks 1222 may be set to different values for each normal periodic task 1222. The control periods T1 and T2 are constant periods. For example, the control period T2 is set to a value greater than the control period T1.

As the normal periodic task 1222, a process of transmitting various message frames to a specific functional unit 200 is performed in response to a certain event or establishment of a condition in some cases. That is, in the normal periodic task 1222, the communication circuit 130 (see FIG. 1) is activated to transmit a message frame to the local bus 2 in response to an event or periodically in some cases.

On the other hand, when the IO refresh process is performed among the tasks included in the primary periodic task 1221, an IO refresh frame is transmitted to the local bus 2 repeatedly at a constant period. The reason why the period is constant is that the configuration of the functional unit 200 connected to the control device 100 is a predetermined configuration. For example, in FIG. 1, three functional units 200 are connected to the control device 100. A data amount exchanged by the three functional units 200 is substantially the same data amount at each period. The data amount is defined in advance by the configuration 126. Accordingly, by causing the communication circuit 130 to transmit the IO refresh frame repeatedly at the constant period, the data amount of the communication data 20 (for example, the input data 134) stored in the buffer 132 is substantially the same data amount at each period.

When "setup switching" or the like is performed to change the configuration of the functional unit 200 connected to the control device 100, the data amount of the communication data 20 is also changed. For example, when the number of functional units 200 connected to the control device 100 increases and the data amount also increases, a transfer time of the input data 134 is longer in some cases than before the data amount increases. Even in these cases, it is necessary to end a time in which the IO refresh process is performed within a constant period so that the time does not exceed a predetermined upper limit time. This is because there is a possibility of the primary periodic task not being performed other than the IO refresh process because of an increase in the time of the IO refresh process. Accordingly, for example, when the data amount of the input data 134 increases, it is necessary to transmit the input data 134 in accordance with a transfer system in which the time of the IO refresh process is within a predetermined range.

Here, a time necessary to transmit the input data 134 stored in the buffer 132 of the communication circuit 130 to the storage unit 114 differs in accordance with a transfer system set when the input data 134 is transmitted. Hereinafter, a relation between a transfer system and a transfer time will be described.

[3. Relation Between Transfer System and Transfer Time]

Figure 3:
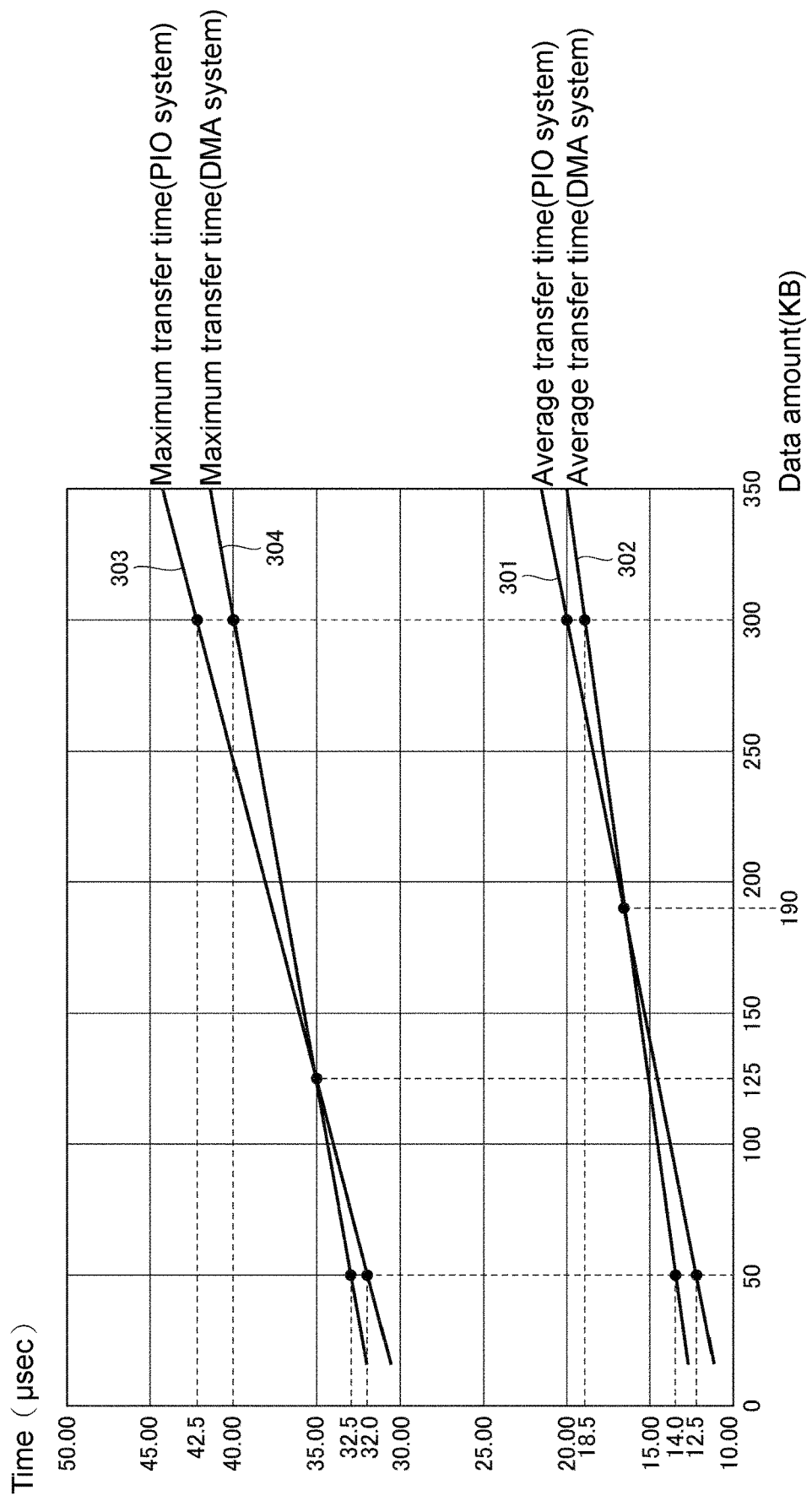
FIG. 3 is a diagram illustrating a transfer time in accordance with a data amount for each transfer system.

A relation between a transfer system and a transfer time will be described with reference to FIG. 3. FIG. 3 is a diagram illustrating a transfer time in accordance with a data amount for each transfer system. A transfer time illustrated in FIG. 3 is, for example, data computed by an experiment. As the transfer systems, there are, for example, the PIO system and the DMA system. Specific transfer methods in the PIO system and the DMA system will be described later.

A first transition line 301 to a fourth transition line 304 in FIG. 3 indicate transitions of the transfer times in each transfer system. More specifically, the first transition line 301 and the second transition line 302 indicate average transfer times when the input data 134 is transmitted a plurality of times (hereinafter also referred to as "average transfer times"). The average transfer time changes in accordance with the data amount. The first transition line 301 indicates transition of an average transfer time in accordance with the PIO system. The second transition line 302 indicates transition of an average transfer time in accordance with the DMA system.

The third transition line 303 and the fourth transition line 304 indicate a maximum transfer time when the input data 134 is transmitted a plurality of times (hereinafter also referred to as a "maximum transfer time"). The maximum transfer time transitions in accordance with a data amount. The third transition line 303 indicates a change in a transfer time in accordance with the PIO system. The fourth transition line 304 indicates a change in a transfer time in accordance with the DMA system.

First, the first transition line 301 and the second transition line 302 will be described. For example, when a data amount of the input data 134 transmitted from the buffer 132 to the storage unit 114 is 50 KB, an average transfer time in the first transition line 301 is 12.5 μsec and an average transfer time in the second transition line 302 is 14.0 μsec. When the data amount of the input data 134 is 50 KB, the transfer time in accordance with the PIO system is shorter than the transfer time in accordance with the DMA system. In contrast, when the data amount is 300 KB, an average transfer time in the first transition line 301 is 20.0 μsec and an average transfer time in the second transition line 302 is 18.5 μsec. When the data amount of the input data 134 is 300 KB, the transfer time in accordance with the DMA system is shorter than the transfer time in accordance with the PIO system.

Whether the transfer time is shorter in the transfer system between the PIO system and the DMA system depends on, for example, whether the data amount is less than 190 KB. More specifically, when the data amount is less than 190 KB, the transfer time of the PIO system is shorter than the transfer time of the DMA system. When the data amount is equal to or greater than 190 KB, the transfer time of the DMA system is shorter than the transfer time of the PIO system. As described above, a transfer speed of the DMA system is faster than a transfer speed of the PIO system. However, in the case of transmission in accordance with the DMA system, a setting process is performed between the processor 112 and the DMA controller 140 before the transmission starts. In this way, when the DMA controller 140 performs transmitting data in accordance with the DMA system, a preliminary process is necessary before the transmission of the data starts. Accordingly, when the data amount is small, the transmission of the data in accordance with the PIO system in which the setting process is not performed ends in a shorter time than the transmission of the data in accordance with the DMA system.

Next, the third transition line 303 and the fourth transition line 304 will be described. For example, when the data amount of the input data 134 transmitted from the buffer 132 to the storage unit 114 is 50 KB, a maximum transfer time in the third transition line 303 is 32.0 μsec and a maximum transfer time in the fourth transition line 304 is 32.5 μsec. When the data amount of the input data 134 is 50 KB, a transfer time in accordance with the PIO system is shorter than a transfer time in accordance with the DMA system. In contrast, when the data amount is 300 KB, an average transfer time in the third transition line 303 is 40.0 μsec and an average transfer time in the fourth transition line 304 is 42.5 μsec. When the data amount of the input data 134 is 300 KB, the transfer time in accordance with the DMA system is shorter than the transfer time in accordance with the PIO system.

Whether the transfer time is shorter in the transfer system between the PIO system and the DMA system depends on, for example, whether the data amount is less than 125 KB. More specifically, when the data amount is less than 125 KB, the transfer time of the PIO system is shorter than the transfer time of the DMA system. When the data amount is equal to or greater than 125 KB, the transfer time of the DMA system is shorter than the transfer time of the PIO system. In this way, the transfer time in each transfer system differs in accordance with the data amount of the input data 134. Therefore, when the data amount of the communication data 20 is changed because of setup switching or the like, the control device 100 measures a transfer time in accordance with each transfer system after the data amount is changed.

The transition lines of FIG. 3 described above are values measured by an experiment. On the other hand, in the control device 100, a measurement unit which will be described below and is a function of the computation processing unit 110 (for example, a measurement unit 116 illustrated in FIG. 7) measures an average transfer time in each transfer system during an operation of a system of the PLC 1. Then, the control device 100 selects a transfer system in which the average transfer time is shorter. In the control device 100, the measurement unit 116 measures the degree of variation in the transfer time in each transfer system during the operation of the system of the PLC 1. The degree of variation in the transfer time will be described below. The measurement unit 116 outputs measurement data including at least one of the average transfer time and the degree of variation in the transfer time to a determination unit to be described below (for example, a determination unit 117 illustrated in FIG. 7). The determination unit 117 determines which system is suitable for the operation of the system of the PLC 1 among the plurality of transfer systems. In this way, the control device 100 measures at least one of the average transfer time and the degree of variation in the transfer time and determines which system is suitable for the operation of the system of the PLC 1 among the plurality of transfer systems.

[4. Description of Transfer System]

The transfer systems of the PIO system and the DMA system will be described with reference to FIGS. 4 and 5. Hereinafter, transmission of the input data 134 will be described. In the transmission of the output data 135, one transfer system is also applied in accordance with a change in the data amount between the transfer systems. When the IO refresh process is performed, the input data 134 is transmitted from the buffer 132 of the communication circuit 130 to the storage unit 114 in accordance with one system of the PIO system and the DMA system. The processor 112 performs a computation process using the input data 134 stored in the storage unit 114.

Figure 4:
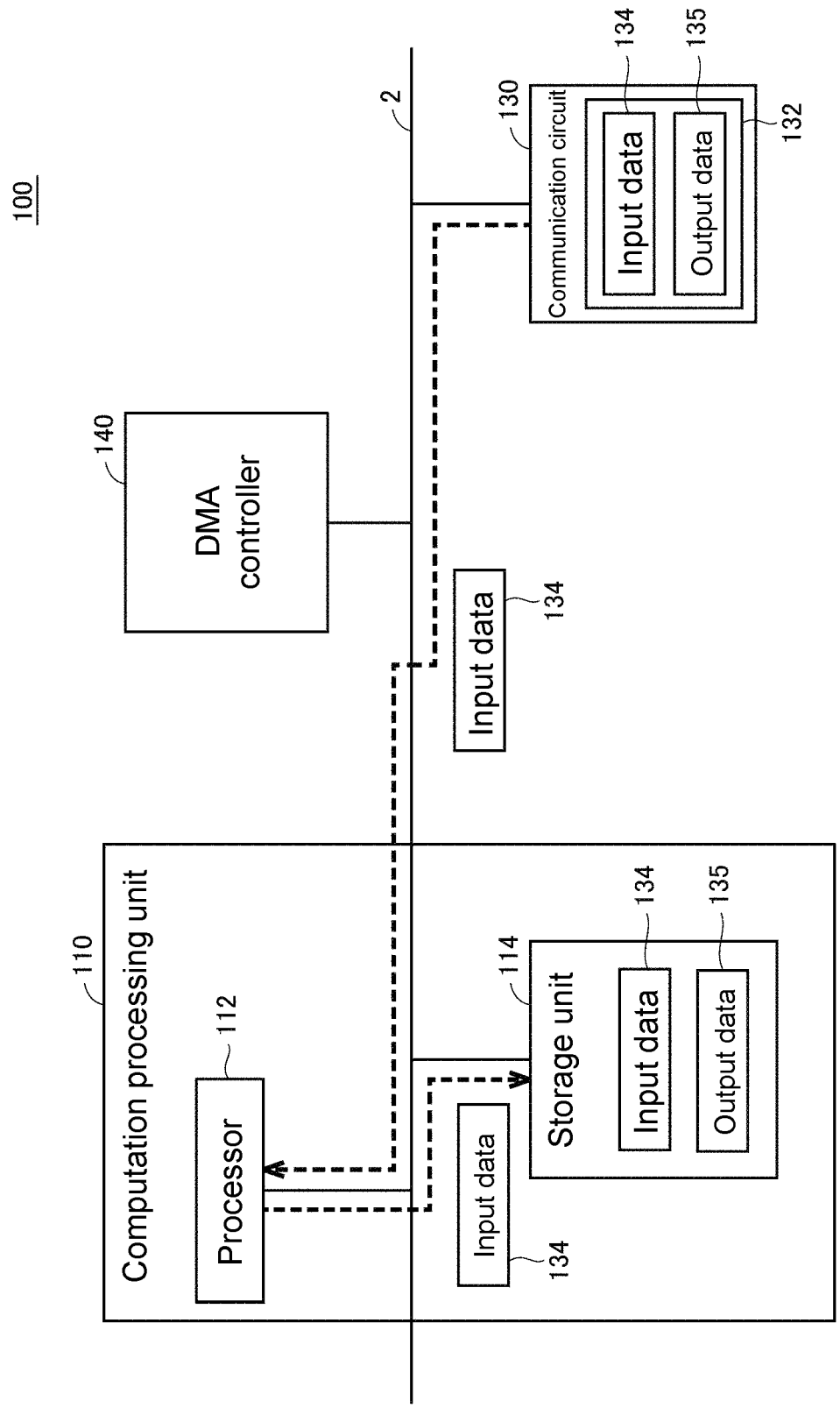
FIG. 4 is a diagram illustrating a process of transmitting input data in accordance with a PIO system.

FIG. 4 is a diagram illustrating a process of transmitting the input data 134 in accordance with the PIO system. FIG. 5 is a diagram illustrating a process of transmitting the input data 134 in accordance with the DMA system. Referring to FIG. 4, the processor 112 reads the input data 134 stored in the buffer 132 of the communication circuit 130. The processor 112 transmits the read input data 134 to the storage unit 114. In this way, in accordance with the PIO system, the input data 134 is transmitted to the storage unit 114 via the processor 112. In other words, in accordance with the PIO system, the processor 112 transmits the input data 134 from the buffer 132 to the storage unit 114 without being involved in the DMA controller 140. A system in which the input data 134 is transmitted via the processor 112 may also be referred to as a firmware (FW) system. Hereinafter, a system in which the input data 134 is transmitted via the processor 112 is referred to as the PIO system in the following description.

Figure 5:
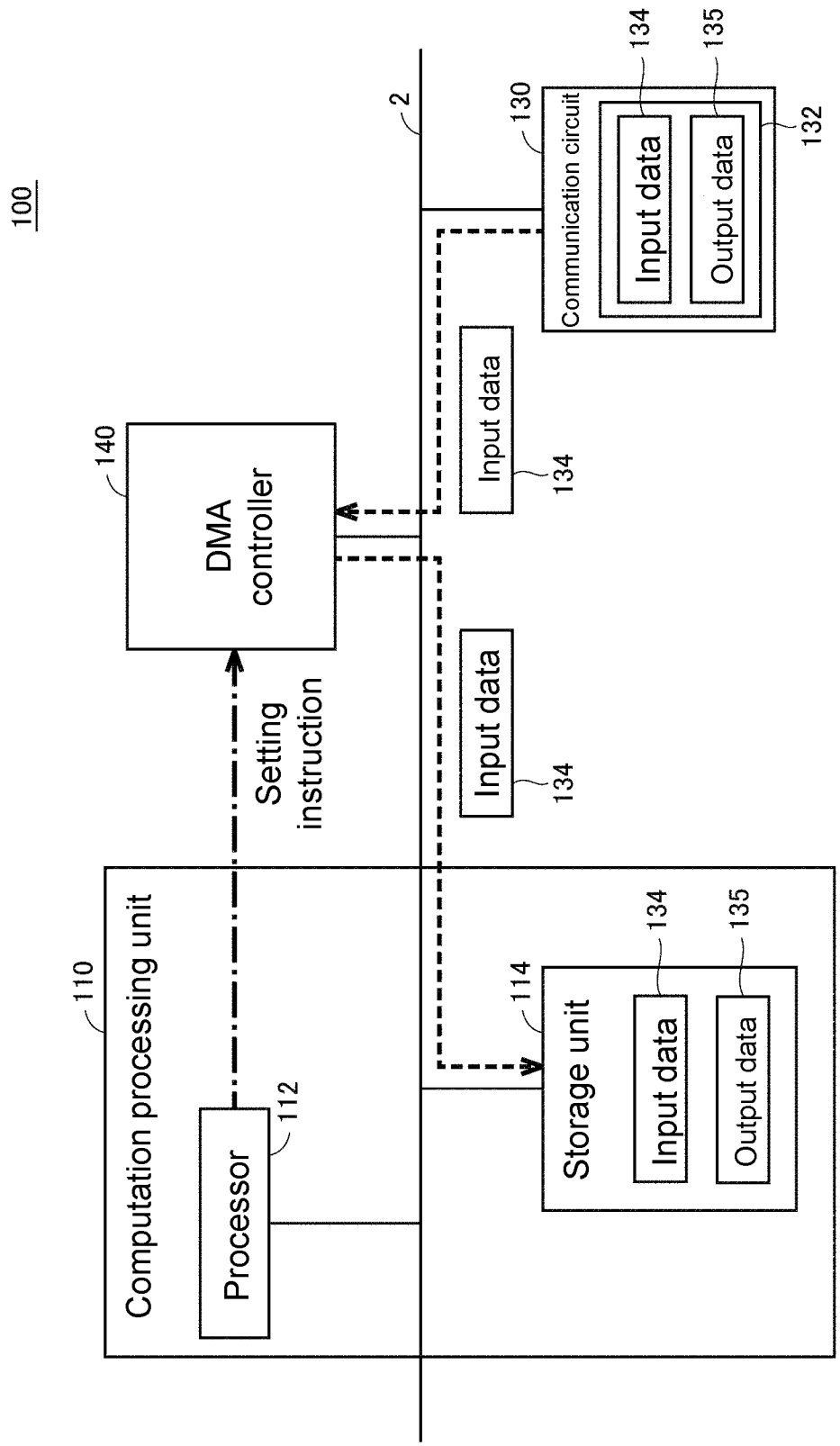
FIG. 5 is a diagram illustrating a process of transmitting input data in accordance with a DMA system.

Referring to FIG. 5, the DMA controller 140 reads the input data 134 stored in the buffer 132 of the communication circuit 130. The DMA controller 140 transfers the read input data 134 to the storage unit 114. In this way, in accordance with the DMA system, the input data 134 is transmitted to the storage unit 114 via the DMA controller 140. In other words, in accordance with the DMA system, the DMA controller 140 transmits the input data 134 from the buffer 132 to the storage unit 114 without being involved in the processor 112. Before the process in accordance with the DMA system is performed, a setting instruction is output from the processor 112 to the DMA controller 140. The DMA controller 140 receiving the setting instruction from the processor 112 starts reading the input data 134 stored in the buffer 132 after setting necessary to start the process is performed.

The control device 100 transmits the input data 134 temporarily stored in the buffer 132 to the storage unit 114 in accordance with one transfer system between the PIO system and the DMA system. The PIO system is a system in which the processor 112 included in the computation processing unit 110 transmits the input data 134 to the storage unit 114. The DMA system is a system in which the DMA controller 140 transmits the input data 134 to the storage unit 114. When the IO refresh process of transmitting the input data 134 is performed, it is necessary to complete the process within a constant period. The computation processing unit 110 measures a time in which the input data 134 stored in the buffer 132 is transmitted to the storage unit 114 (hereinafter also referred to as a "first transfer time") in accordance with the PIO system (hereinafter also referred to as "first transfer system"). The computation processing unit 110 measures a time in which the input data 134 stored in the buffer 132 is transmitted to the storage unit 114 (hereinafter also referred to as a "second transfer time") in accordance with the DMA system (hereinafter also referred to as a "second transfer system"). Of the first transfer time and the second transfer time, the computation processing unit 110 selects, for example, a transfer system in which the time is shorter as the transfer system in which the input data 134 is transmitted.

[5. First and Second Transfer Times]

Figure 6:
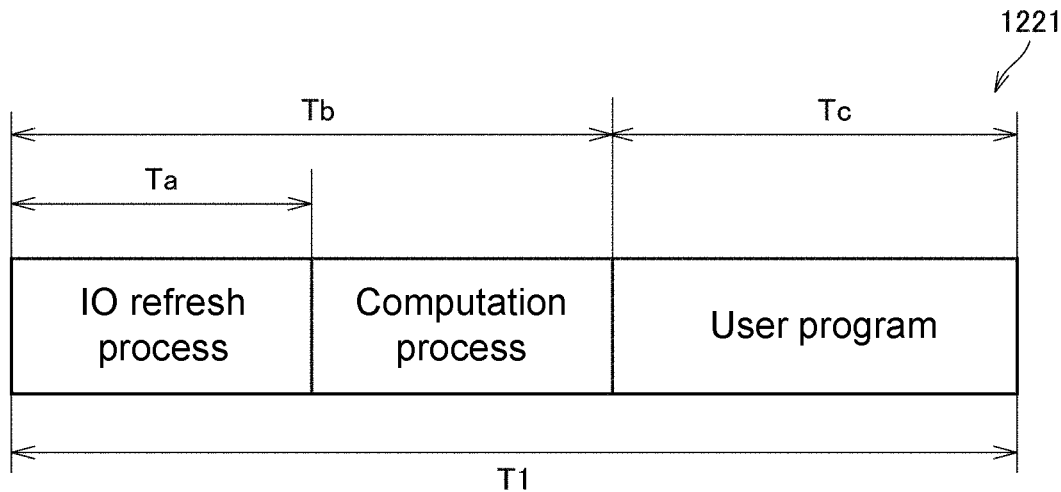
FIG. 6 is a diagram illustrating an example of a primary periodic task.

A correspondence relation between the first and second transfer times and the primary periodic task 1221 will be described with reference to FIG. 6. FIG. 6 is a diagram illustrating an example of the primary periodic task 1221. The primary periodic task 1221 includes the IO refresh process. The primary periodic task 1221 includes a computation process and a user program performed at the first priority after the IO refresh process. For example, in the control period T1 in which the IO refresh process, the computation process, and the user program are performed, the first transfer time in accordance with the first transfer system or the second transfer time in accordance with the second transfer system is a time included in a period Ta in which the IO refresh process is performed. On the other hand, the first transfer time or the second transfer time may be a time included in a period Tb in which the IO refresh process and the computation process are performed. The computation process is a process performed by the processor 112 using the input data 134 transmitted from the buffer 132 to the storage unit 114.

In this way, a time in which the input data 134 is transmitted from the buffer 132 to the storage unit 114 is one of a time in the period Ta including the time in which the IO refresh process is performed and a time in the period Tb including times of the IO refresh process and the computation process. More specifically, the first transfer time is, for example, a time of one between a transfer time in which the input data 134 is transmitted from the buffer 132 to the storage unit 114 in accordance with the PIO system (a time included in the period Ta) and a time of one between a process execution time including the transfer time and the time in which the computation process is performed (a time included in the period Tb). The second transfer time is, for example, a time of one between a transfer time in which the input data 134 is transmitted from the buffer 132 to the storage unit 114 in accordance with the DMA system (a time included in the period Ta) and a process execution time including the transfer time and the time in which the computation process is performed (a time included in the period Tb). Thus, the PLC 1 can measure, as a transfer time in the primary periodic task 1221, a time of only the IO refresh process in each transfer system or a time including the IO refresh process and the computation process. Accordingly, when the first transfer time and the second transfer time are called below, the time may be any of the time of only the IO refresh process (the time included in the period Ta) and a time (the time included in the period Tb) including the IO refresh process and the computation process.

A period Tc is a time including the user program 124. The control period T1 is a predetermined time (for example, 2,000 μsec). Therefore, when the number of user programs 124 included in the period Tc is small, an upper limit time of at least one of the periods Ta and Tb can be lengthened. For example, when the number of user programs is 0 (zero), the control period T1=the period Tb can be set. Conversely, when the number of user programs 124 increases, it is necessary to shorten at least one time of the period Ta and the period Tb because of the control period T1 that is the predetermined time. Accordingly, a selection unit 118 of the computation processing unit 110 selects a transfer system in which the transfer time of the input data 134 in the IO refresh process is short, and thus it is possible to shorten the transfer time. Thus, the PLC 1 can guarantee a more time in which the user program 124 is executed.

Figure 7:
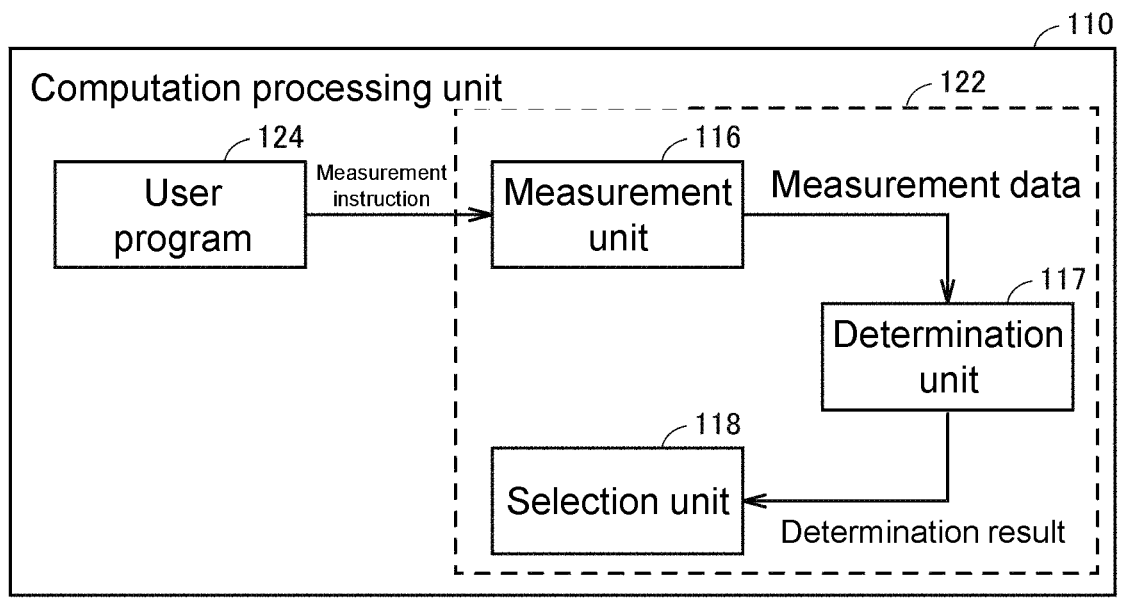
FIG. 7 is a functional block diagram illustrating a function of selecting a transfer system for input data based on a predetermined condition.

Hereinafter, a condition and a function for selecting a transfer system will be described below. FIG. 7 is a functional block diagram illustrating a function of selecting a transfer system for the input data 134 based on a predetermined condition. The computation processing unit 110 includes the measurement unit 116, the determination unit 117, the selection unit 118, and the user program 124. The measurement unit 116, the determination unit 117, and the selection unit 118 are, for example, functions realized by the system program 122.

The user program 124 outputs a measurement instruction to the measurement unit 116. The user program 124 is executed when a process is performed in a predetermined order in a scheduler (not illustrated) and a timing at which the process of the user program 124 is performed comes. When the process of the user program 124 is performed, the measurement unit 116 receiving the measurement instruction computes a transfer time of the input data 134 in accordance with each transfer system of the PIO system and the DMA system. The measurement unit 116 measures a time in which the input data 134 is read from the buffer 132 and is transmitted to the storage unit 114 in each system based on a value counted by the highly accurate timer 160.

Then, the measurement unit 116 transmits the input data 134 a plurality of times in each system and computes transfer times. The measurement unit 116 computes an average transfer time indicating an average transfer time of each system based on the plurality of transfer times. The measurement unit 116 transmits measurement data including the average transfer time of each transfer system to the determination unit 117.

Based on the measurement data, the determination unit 117 determines whether a predetermined determination condition is satisfied. The determination condition is, for example, a condition for selecting a transfer system in which the average transfer time is short. The determination unit 117 compares the average transfer time in accordance with the PIO system with the average transfer time in accordance with the DMA system and determines which system has the shorter average transfer time. For example, when the determination unit 117 determines that the average transfer time of the PIO system is shorter than the average transfer time of the DMA system, the determination result is output to the selection unit 118.

The selection unit 118 receiving the determination result selects the PIO system as a new transfer system for the input data 134 when a presently set transfer system is the DMA system. The selection unit 118 receiving the determination result continues the transmission in accordance with the presently selected PIO transfer system when the presently set transfer system is the PIO system. In this way, the PLC 1 can select one transfer system in accordance with the average transfer time in each system. The PLC 1 can select an optimum transfer system in accordance with a data amount during the operation of the system. The PLC 1 can select the transfer system in which the time in which the input data 134 is transmitted from the buffer 132 to the storage unit 114 is shorter during the operation of the system, and thus it is possible to shorten a time necessary for the IO refresh process. Further, when the processing time in the IO refresh process is shortened, the PLC 1 can increase the number of processes (for example, processes in accordance with the user program) performed in the primary periodic task in a process other than the IO refresh process.

The determination condition in the determination unit 117 may be set to, for example, the degree of variation in a transfer time. More specifically, for example, the determination unit 117 determines whether the condition is satisfied based on the determination condition that the transfer system in which the transfer time has a small degree of variation can be selected. The degree of variation is, for example, a standard deviation of a plurality of transfer times. The processing time of the IO refresh process is not determined when the degree of variation is large. Therefore, there is a possibility that the process cannot end within a constant period.

The measurement unit 116 computes the degree of variation in the transfer time of each system based on the plurality of transfer times. For example, the measurement unit 116 computes the degree of variation based on a standard deviation of the plurality of transfer times. The measurement unit 116 transmits the measurement data including the degree of variation in each transfer system to the determination unit 117.

The determination unit 117 compares the degree of variation in accordance with the PIO system with the degree of variation in accordance with the DMA system and determines which system has a smaller degree of variation. For example, when the determination unit 117 determines that the degree of variation in accordance with the PIO system is less than the degree of variation in accordance with the DMA system, the determination result is output to the selection unit 118. The selection unit 118 receiving the determination result selects the PIO system as a new transfer system of the input data 134 when the presently set transfer system is the DMA system.

The selection unit 118 receiving the determination result continues the transmission in accordance with the presently selected PIO transfer system when the presently set transfer system is the PIO system. In this way, the PLC 1 can select one transfer system in accordance with the degree of variation in the transfer time in each system. The PLC 1 can select the transfer system in which a variation in a time in which the input data 134 is transmitted from the buffer 132 to the storage unit 114 is small, and thus it is possible to reliably end the IO refresh process at a constant period. Further, when the IO refresh process is reliably ended at the constant period, the PLC 1 can prevent another process included in the primary periodic task from not being performed.

[6. Process of Selecting Transfer System in First Embodiment]

Figure 8:
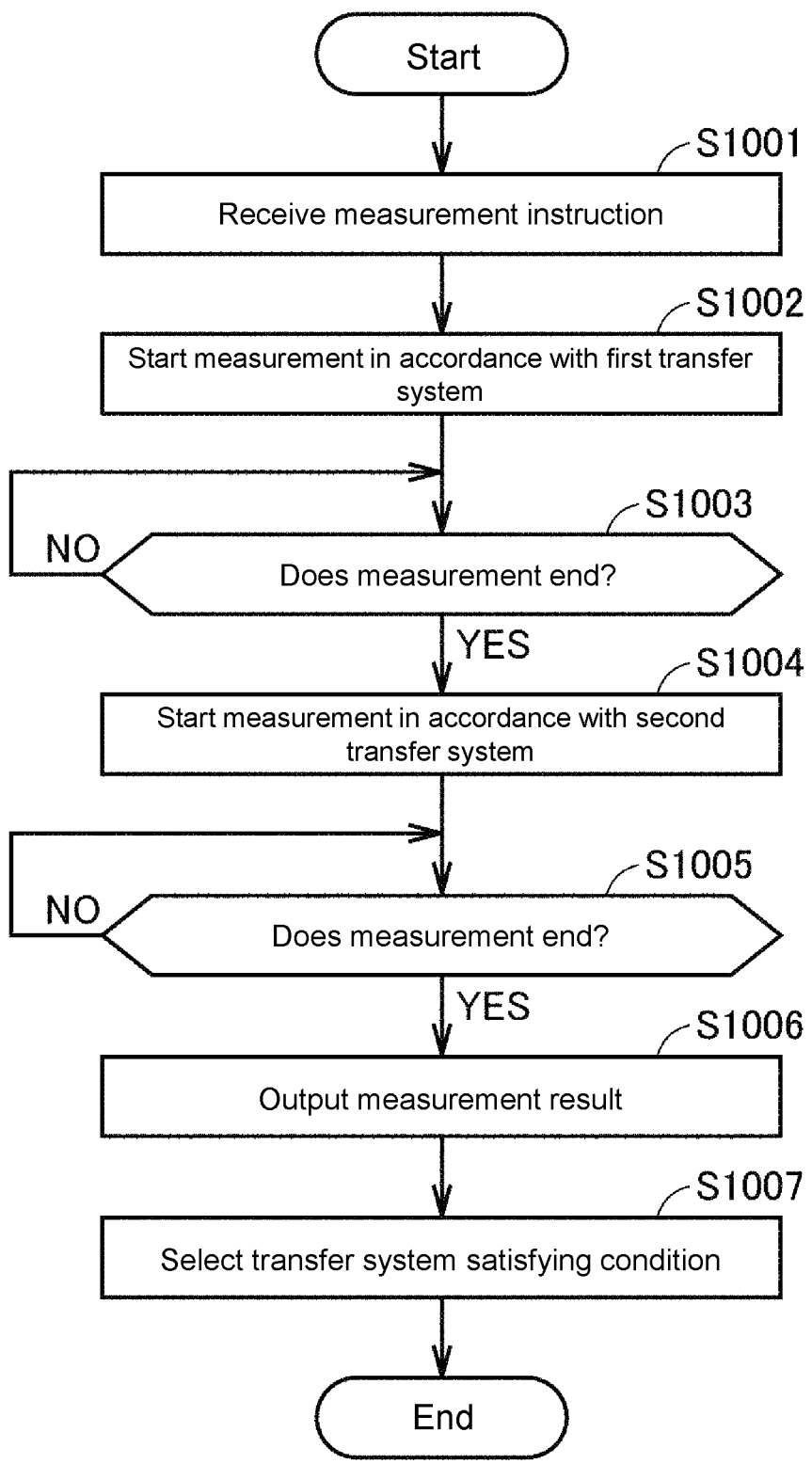
FIG. 8 is a flowchart illustrating a process of selecting a transfer system satisfying the predetermined condition.

A control structure of the control device 100 will be described with reference to FIG. 8. FIG. 8 is a flowchart illustrating a process in which the computation processing unit 110 selects a transfer system satisfying the predetermined condition. In step S1001, the computation processing unit 110 receives a measurement instruction based on the user program 124. The measurement instruction is output, for example, when power is supplied to the control device 100 (power is turned on) or the configuration of the functional unit 200 is changed (the "setup switching" is performed).

In step S1002, the computation processing unit 110 starts measuring a transfer time in accordance with the first transfer system (for example, the PIO system). The computation processing unit 110 detects a start timing in the transmission of the input data 134 corresponding to one period using the highly accurate timer 160.

In step S1003, the computation processing unit 110 determines whether the measurement ends. The computation processing unit 110 measures a predetermined number (for example, 2,000) of transfer times in accordance with the PIO system. When the computation processing unit 110 detects an end timing in the transmission of the input data 134 corresponding to one period and then determines that the predetermined number of measurements ends (YES in step S1003), the control is switched to step S1004. Otherwise (NO in step S1003), the computation processing unit 110 switches control to step S1003 and continues the measurement until the predetermined number.

The computation processing unit 110 acquires a count value of the start timing in the transmission of the input data 134 corresponding to one period and a count value of the end timing until the end of the transmission of the input data 134 corresponding to the same one period after the start of the counting using the highly accurate timer 160, as described above. The computation processing unit 110 detects a difference between the count value of the start timing and the count value of the end timing in the measurement of the transfer time corresponding to one period as the first transfer time in accordance with the first transfer system.

In step S1004, the computation processing unit 110 starts the measurement in accordance with the second transfer system (for example, the DMA system). The computation processing unit 110 detects the start timing in the transmission of the input data 134 corresponding to one period using the highly accurate timer 160.

In step S1005, the computation processing unit 110 determines whether the measurement ends. The computation processing unit 110 measures a predetermined number (for example, 2,000) of transfer times in accordance with the DMA system. When the computation processing unit 110 determines that the measurement ends (YES in step S1005), the control is switched to step S1006. Otherwise (NO in step S1005), the computation processing unit 110 switches control to step S1005 and continues the measurement until the predetermined number.

The computation processing unit 110 acquires a count value of the start timing in the transmission of the input data 134 corresponding to one period and a count value of the end timing until the end of the transmission of the input data 134 corresponding to the same one period after the start of the counting using the highly accurate timer 160, as described above. The computation processing unit 110 detects a difference between the count value of the start timing and the count value of the end timing in the measurement of the transfer time corresponding to one period as the second transfer time in accordance with the second transfer system.

In step S1006, the computation processing unit 110 outputs the measurement data including the first transfer time, the second transfer time, the degree of variation in the first transfer time, and the degree of variation in the second transfer time. The computation processing unit 110 outputs the measurement data to the determination unit 117.

In step S1007, the computation processing unit 110 selects the transfer system in response to the satisfied predetermined condition. The computation processing unit 110 selects, for example, the transfer system in which the condition that the average transfer time is short is satisfied. More specifically, when the average transfer time in accordance with the first transfer system is determined to be shorter in the transfer system between the average transfer time in accordance with the first transfer system and the average transfer time in accordance with the second transfer system and the presently set transfer system is the second transfer system, the computation processing unit 110 selects the first transfer system as a subsequent transfer system. The computation processing unit 110 continues the setting of the present system without selecting a new transfer system When the presently set transfer system is the first transfer system.

Thus, the PLC 1 can shorten the time in which the input data 134 is transmitted from the buffer 132 to the storage unit 114. The PLC 1 can also select, for example, the transfer system in which the degree of variation is small. Thus, the PLC 1 can reliably end the process of transmitting the input data 134 from the buffer 132 to the storage unit 114 within the constant period.

The computation processing unit 110 may also select the transfer system based on the switching of the average transfer time or the degree of variation in the transfer time in accordance with the first transfer system and the degree of variation in the transfer time in accordance with the second transfer system. Further, the computation processing unit 110 may select the transfer system based on both the average transfer time and the degrees of variation.

Second Embodiment

The PLC 1 according to a second embodiment is realized using the same hardware configuration as the PLC 1 according to the above-described embodiment. Accordingly, description of the same hardware configuration will not be repeated.

In the first embodiment, the measurement unit 116, the determination unit 117, and the selection unit 118 included in the computation processing unit 110 have been realized by the system program 122, as described above. Thus, the functions of the measurement unit 116, the determination unit 117, and the selection unit 118 may be realized in accordance with the user program 124. A user may generate a functional block or the like in advance using a support device 300 to be described below and transmit the generated user program 124 to the control device 100, so that the foregoing functions can be realized in the control device 100. Hereinafter, a specific example of the user program 124 that has the functions of the measurement unit 116, the determination unit 117, and the selection unit 118 will be described.

[Specific Example of User Program 124]

Figure 9:
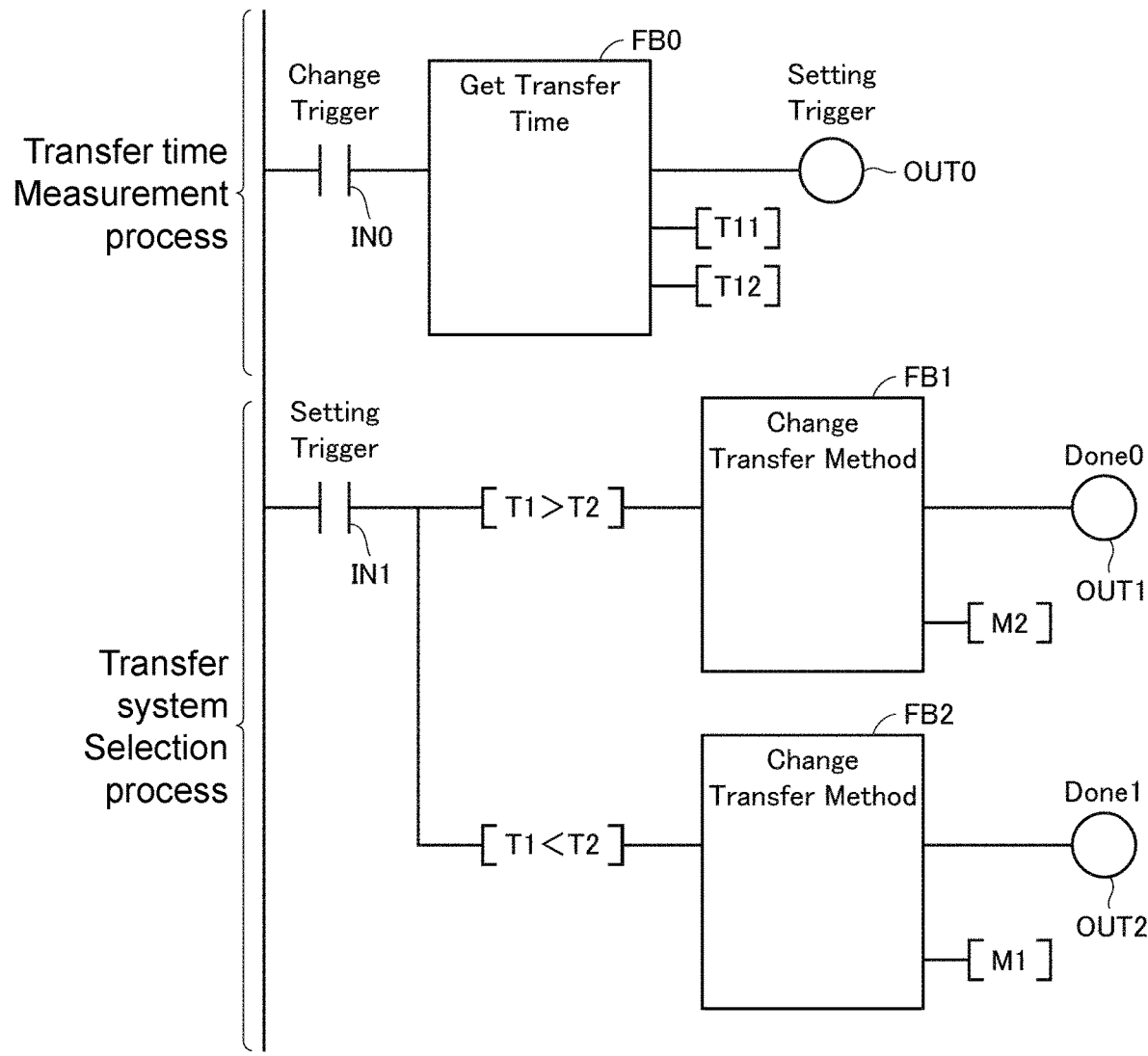
FIG. 9 is a diagram illustrating an example of a user program selecting a transfer system.

A specific example of the user program 124 for realizing the function or the like of the selection unit 118 will be described with reference to FIG. 9. FIG. 9 is a diagram illustrating an example of the user program 124 selecting the transfer system. In the example of FIG. 8, the user program 124 is defined as a ladder program. For example, when supply of power is started from a state in which power is not supplied to the control device 100 or the configuration of the functional unit 200 is changed (the setup switching is performed), the user program 124 starts measuring the first and second transfer times. When the transfer system is selected after end of the measurement of the first and second transfer times, transmission of data is performed in accordance with a selected new transfer system. In this way, the PLC 1 can perform the measurement of the transfer times at a timing at which a transfer system different from the presently set transfer system is likely to be selected during an operation of a system.

The user program 124 is defined by input elements IN0 and IN1, functional blocks FB0 to FB2, and output elements OUT0 to OUT2.

The values of the input elements IN0 and IN1 are changed in accordance with assigned variables. More specifically, a variable "ChangeTrigger" is assigned to the input element IN0. The variable "ChangeTrigger" is of a BOOL type and an initial value is "False" (=OFF). For example, the value of the variable "ChangeTrigger" is changed to "True" (=ON) based on activation of the control device 100. In other cases, the value of the variable "ChangeTrigger" is "False" (=OFF).

A variable "Setting Trigger" is assigned to the input element IN1. The variable "SettingTrigger" is of a BOOL type and an initial value is "False" (=OFF). The variable "SettingTrigger" is associated with an output of the functional block FB0. When the output of the functional block FB0 becomes "True" (=ON), the value of the input element IN1 becomes "True" (=ON). Conversely, when the output of the functional block FB0 becomes "False" (=OFF), the value of the input element IN1 becomes "False" (=OFF).

Next, the functional blocks FB0, FB1, and FB2 will be described in detail. The functional block FB0 is a program for measuring a transfer time of the input data 134 and corresponds to a command included in the user program 124. Based on the variable "SettingTrigger" that becomes "True" (=ON), a signal "True" (=ON) indicating validity is input to an input unit of the functional block FB1. Based on this, the functional block FB0 starts measuring the first transfer time T11 in accordance with the PIO system and the second transfer time T12 in accordance with the DMA system.

The functional block FB1 is a program for selecting a transfer system and corresponds to a command included in the user program 124. Based on the fact that the first transfer time T11 measured by the functional block FB0 is longer than the second transfer time T12, the signal "True" (=ON) indicating validity is input to the input unit of the functional block FB1. Based on this, the functional block FB1 selects a DMA system M2 when a present transfer system is a PIO system M1. The functional block FB1 keeps the setting of the present transfer system without selecting another system when the present transfer system is the DMA system M2.

The functional block FB2 is a program for selecting a transfer system and corresponds to a command included in the user program 124. Based on the fact that the first transfer time T11 measured by the functional block FB0 is shorter than the second transfer time T12, the signal "True" (=ON) indicating validity is input to the input unit of the functional block FB2. Based on this, the functional block FB2 selects the PIO system M1 when a present transfer system is the DMA system M2. The functional block FB1 keeps the setting of the present transfer system without selecting another system when the present transfer system is the PIO system M1.

Values of the output elements OUT0 to OUT2 are changed in accordance with output values of the associated functional blocks, respectively. The variable "SettingTrigger" is assigned to the output element OUT0. The output element OUT0 is associated with an output of the functional block FB0. As a result, the value of the output element OUT0 is changed in accordance with the value of the output.

A variable "Done0" is assigned to the output element OUT1. The output element OUT1 is associated with the output of the functional block FB1. As a result, the value of the output element OUT1 is changed in accordance with the value of the output of the functional block FB1.

A variable "Done1" is assigned to the output element OUT2. The output element OUT2 is associated with the output of the functional block FB2. As a result, the value of the output element OUT2 is changed in accordance with the value of the output of the functional block FB2.

In this way, based on the measurement data (for example, measurement times), the DMA system is selected by the functional block FB1 and the PIO system is selected by the functional block FB2.

Third Embodiment

A PLC 1*a* according to a third embodiment has a configuration partially different from the PLC 1 according to the above-described embodiments and is realized with the same remaining configuration. Accordingly, description of the same configuration is not repeated. Hereinafter, different configurations and processes will be described.

In the first embodiment, the control device 100 has selected the transfer system in response to the satisfied predetermined condition. In the third embodiment, however, a transfer system is selected in response to an instruction from a user.

[Device Configuration of PLC 1*a*]

Figure 10:
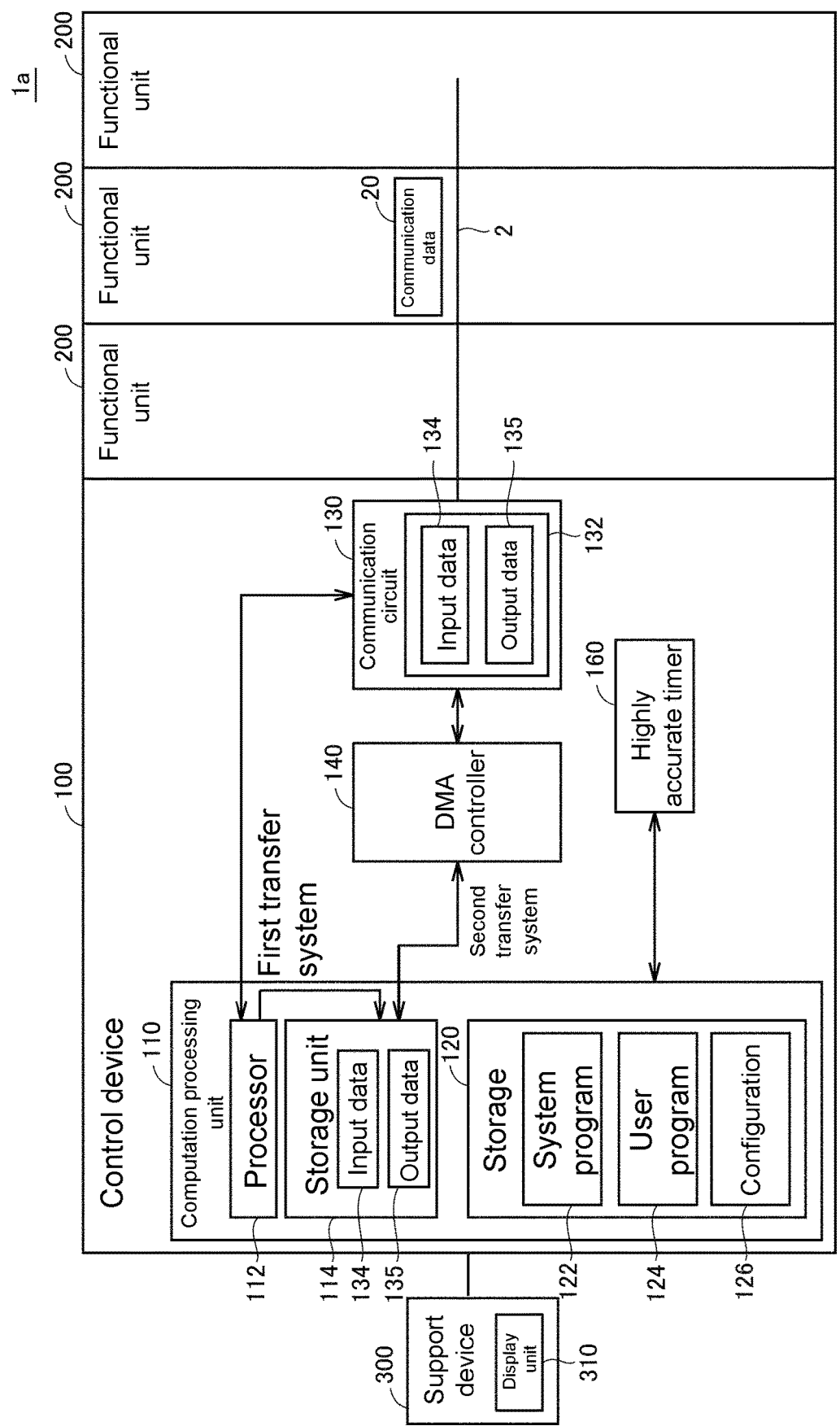
FIG. 10 is a schematic diagram illustrating a configuration of main units of a PLC according to a second embodiment.

FIG. 10 is a schematic diagram illustrating a configuration of main units of the PLC 1*a* according to the second embodiment. The PLC 1*a* typically includes the control device 100, the one or plurality of functional units 200, and a support device 300. The support device 300 is electrically connected to the control device 100 and receives measurement data measured by the control device 100. The support device 300 includes a display unit 310 and displays an image based on the measurement data. The image displayed on the display unit 310 will be described later.

Figure 11:
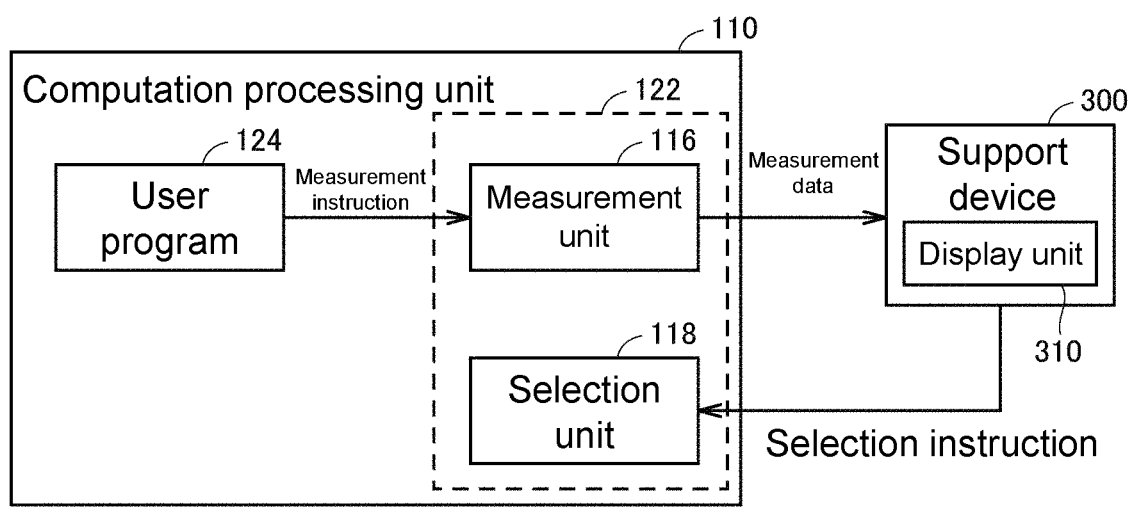
FIG. 11 is a functional block diagram illustrating a function of selecting a transfer system for input data in response to an instruction from a user.

A function of selecting a transfer system in response to an instruction from a user will be described with reference to FIG. 11. FIG. 11 is a functional block diagram illustrating the function of selecting a transfer system for the input data 134 in response to an instruction from the user. The computation processing unit 110 includes the measurement unit 116, the selection unit 118, and the user program 124. Functions of the measurement unit 116 and the selection unit 118 are realized by, for example, the system program 122. The measurement unit 116 of the computation processing unit 110 transmits the measurement data to the support device 300. The support device 300 receiving the measurement data displays an image based on the measurement data on the display unit 310.

The selection unit 118 of the computation processing unit 110 can select a transfer system based on an instruction from a user operating the support device 300. More specifically, the selection unit 118 displays an image based on the measurement data on the display unit 310 of the support device 300. The support device 300 transmits a selection instruction to select the transfer system selected by the user viewing the image displayed on the display unit 310 to the selection unit 118. The selection unit 118 selects the transfer system based on the selection instruction. Thus, the PLC 1 can select an optimum transfer system in accordance with the data amount during the operation of the system. More specifically, the PLC 1 can select the transfer system in response to an instruction from the user giving the instruction to select the transfer system in which the transfer time of the input data 134 from the buffer 132 to the storage unit 114 is shorter during the operation of the system. The PLC 1 can shorten a time necessary for the IO refresh process. The PLC 1 can increase the number of processes (for example, processes in accordance with the user program)

performed in the primary periodic task other than the IO refresh process because the processing time in the IO refresh process is shortened.

[Image Based on Measurement Data]

Figure 12:
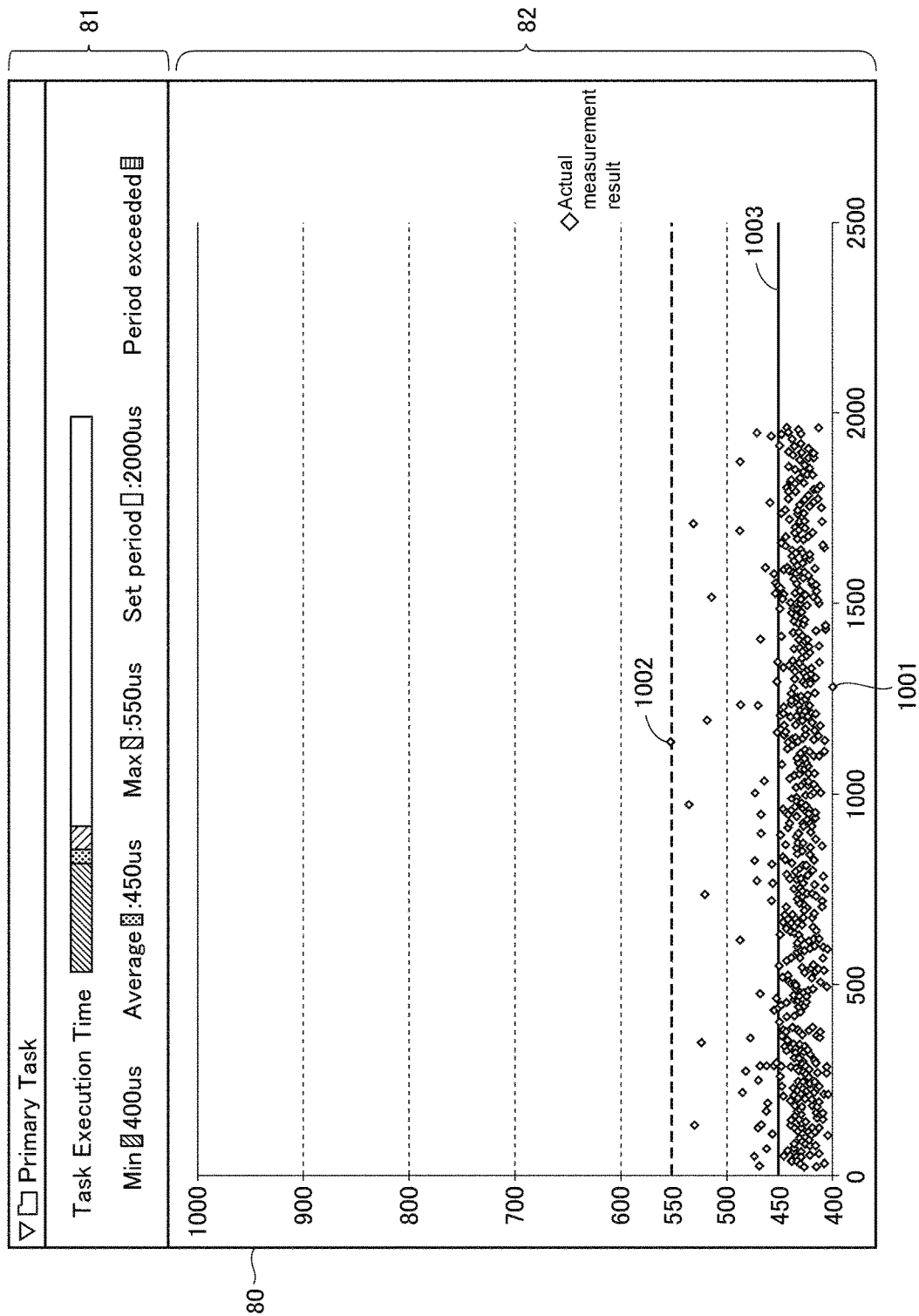
FIG. 12 is a diagram illustrating an image generated based on measurement data including a transfer time in accordance with a first transfer system.
Figure 13:
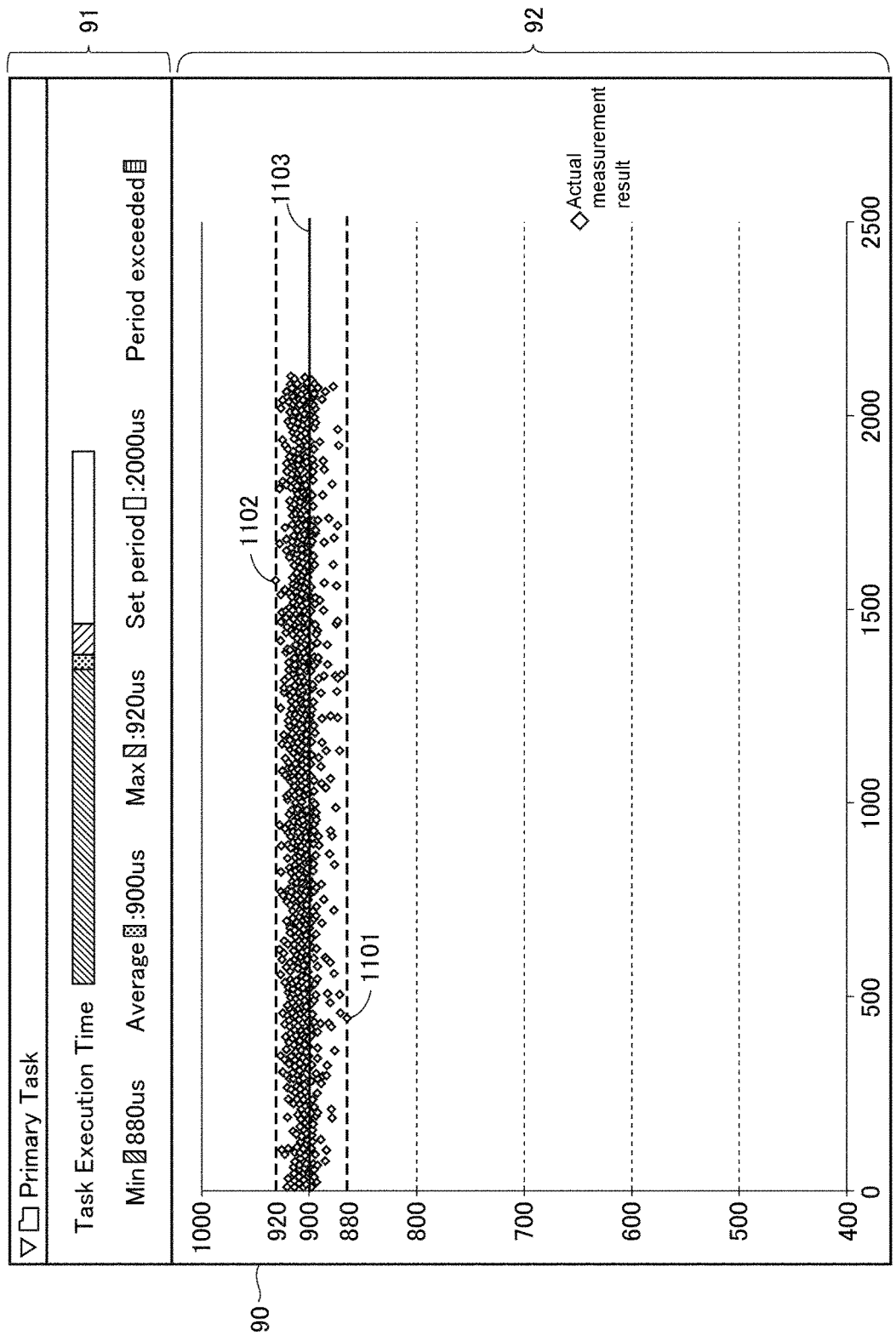
FIG. 13 is a diagram illustrating an image generated based on measurement data including a transfer time in accordance with a second transfer system.

An image displayed on the display unit 310 of the support device 300 will be described with reference to FIGS. 12 and 13. More specifically, an image based on measurement data including a transfer time in accordance with the first transfer system (for example, the PIO system) and an image based on measurement data including a transfer time in accordance with the second transfer system (for example, the DMA system) will be described. FIG. 12 is a diagram illustrating an image generated based on measurement data including a transfer time in accordance with the first transfer system. FIG. 13 is a diagram illustrating an image generated based on measurement data including a transfer time in accordance with the second transfer system.

Referring to FIG. 12, a first image 80 is an image indicating a result when the computation processing unit 110 actually measures the transmission in accordance with the first transfer system, for example, about 2,000 times. The first image 80 includes a first display region 81 and a second display region 82. The first display region 81 includes an image indicating a task execution time.

A time of the entire task execution time is a time corresponding to the control period T1 of the primary periodic task 1221 described with reference to FIG. 2 or 7. That is, the task execution time indicates a time including at least the IO refresh process. More specifically, with regard to the task execution time, a minimum transfer time (Min) in which the transfer time is the shortest in the measurement data is displayed when the transfer time of the input data 134 is measured a plurality of times and a certain data amount (for example, 50 KB) is stored in the buffer 132. The minimum transfer time is, for example, 400 μsec. An average transfer time (Average) of the measurement data is displayed when the number of measurements is plural. The average transfer time is, for example, 450 μsec. Further, a maximum transfer time (Max) in which the transfer time is the longest in the measurement data is displayed. The maximum transfer time is, for example, 550 μsec. A set time (set period) is a time corresponding to the control period T1 and indicates a maximum time (for example, 2,000 μsec) allowed for transmission of the communication data 20.

In this way, the display unit 310 of the support device 300 displays a maximum time allowed for the transmission of the communication data 20 (for example, the input data 134) and an actually measured time when the input data 134 is transmitted in accordance with the PIO system. The actually measured time is, for example, at least one of the minimum transfer time, the average transfer time, and the maximum transfer time. The support device 300 displays the first image 80 in which a maximum time allowed for the transmission of the communication data 20 can be compared with the actually measured transfer time when the communication data is transmitted in accordance with the PIO system, on the display unit 310 based on the measurement data.

In the second display region 82, the vertical time represents a time (μsec) and the horizontal axis represents the number of actual measurements (times). The second display region 82 includes measurement data when the transfer time is measured a plurality of times. An actual measurement value 1001 indicates a minimum transfer time (for example, 400 μsec). An actual measurement value 1002 indicates a maximum transfer time (for example, 550 μsec). An average line 1003 indicates an average transfer time (for example, 450 μsec). The actual measurement value 1001 indicating the minimum transfer time, the actual measurement value 1002 indicating the maximum transfer time, and the average line 1003 indicating the average transfer time in the second display region 82 are values corresponding to a minimum transfer time, a maximum transfer time, and an average transfer time in the first display region 81.

The PLC 1 can supply an image in which the user can ascertain the average time in the transmission of the input data 134 in accordance with the PIO system at a glance by displaying the first image 80 including the average transfer time of the transfer times in accordance with the first transfer system on the display unit 310 of the support device 300. The PLC 1 can supply an image in which the user can ascertain the degree of variation in the transfer time in the transfer of the input data 134 in accordance with the first transfer system at a glance by displaying the first image 80 including the minimum transfer time and the maximum transfer time in accordance with the first transfer system and a plurality of actual measurement values on the display unit 310 of the support device 300.

The actual measurement value 1001, the actual measurement value 1002, and the average line 1003 in the second display region 82 may be displayed in an aspect distinguishable from other actual measurement values. More specifically, the actual measurement value 1001, the actual measurement value 1002, and the average line 1003 may be changed in comparison with other actual measurement values. For example, at least one of a color, a form, a size, and the like may be compared with other actual measurement values. The actual measurement value 1001, the actual measurement value 1002, and the average line 1003 may be displayed in a flickering manner.

Referring to FIG. 13, a second image 90 is an image indicating a result when the computation processing unit 110 actually measures the transfer time in accordance with the DMA system, for example, about 2,000 times. The second image 90 includes a first display region 91 and a second display region 92. The first display region 91 includes an image indicating a task execution time.

A time of the entire task execution time is, for example, a time corresponding to the control period T1 of the primary periodic task 1221 described with reference to FIG. 2 or 7. That is, the task execution time indicates a time including at least the IO refresh process. More specifically, with regard to the task execution time, a minimum transfer time (Min) in which the transfer time is the shortest in the measurement data is displayed when the transfer time of the input data 134 is measured a plurality of times and a certain data amount (for example, 50 KB) is stored in the buffer 132. The minimum transfer time is, for example, 880 μsec. An average transfer time (Average) of the measurement data is displayed when the number of measurements is plural. The average transfer time is, for example, 900 μsec. Further, a maximum transfer time (Max) in which the transfer time is the longest in the measurement data is displayed. The maximum transfer time is, for example, 920 μsec. A set time (set period) is a time corresponding to the control period T1 and indicates a maximum time (for example, 2,000 μsec) allowed for transmission of the communication data 20, on the display unit 310 based on the measurement data.

In this way, the display unit 310 of the support device 300 displays a maximum time allowed for the transmission of the communication data 20 (for example, the input data 134) and an actually measured time when the input data 134 is transmitted in accordance with the second transfer system. The actually measured time is, for example, at least one of the minimum transfer time, the average transfer time, and the maximum transfer time. In this way, the support device 300 displays the image in which a maximum time allowed for the transmission of the communication data 20 can be compared with the actually measured transfer time when the communication data is transmitted in accordance with the second system on the display unit 310 based on the measurement data.

In the second display region 92, the vertical time represents a time (μsec) and the horizontal axis represents the number of actual measurements (times). The second display region 92 includes measurement data when the transfer time is measured a plurality of times. An actual measurement value 1101 indicates a minimum transfer time (for example, 880 μsec). An actual measurement value 1102 indicates a maximum transfer time (for example, 920 μsec). An average line 1103 indicates an average transfer time (for example, 900 μsec). The actual measurement value 1101 indicating the minimum transfer time, the actual measurement value 1102 indicating the maximum transfer time, and the average line 1103 indicating the average transfer time in the second display region 92 are values corresponding to a minimum transfer time, a maximum transfer time, and an average transfer time in the first display region 91.

The PLC 1 can supply an image in which the user can ascertain the average time in the transmission of the input data 134 in accordance with the second transfer system at a glance by displaying the second image 90 including the average transfer time of the transfer times in accordance with the second transfer system on the display unit 310 of the support device 300. The PLC 1 can supply an image in which the user can ascertain the degree of variation in the transfer time in the transfer of the input data 134 in accordance with the second transfer system at a glance by displaying the second image 90 including the minimum transfer time and the maximum transfer time in accordance with the second transfer system and a plurality of actual measurement values on the display unit 310 of the support device 300.

The actual measurement value 1101, the actual measurement value 1102, and the average line 1103 in the second display region 92 may be displayed in an aspect distinguishable from other actual measurement values. More specifically, the actual measurement value 1101, the actual measurement value 1102, and the average line 1103 may be changed in comparison with other actual measurement values. For example, at least one of a color, a form, a size, and the like may be compared with other actual measurement values. The actual measurement value 1101, the actual measurement value 1102, and the average line 1103 may be displayed in a flickering manner.

[Device Configuration of Support Device 300]

Figure 14:
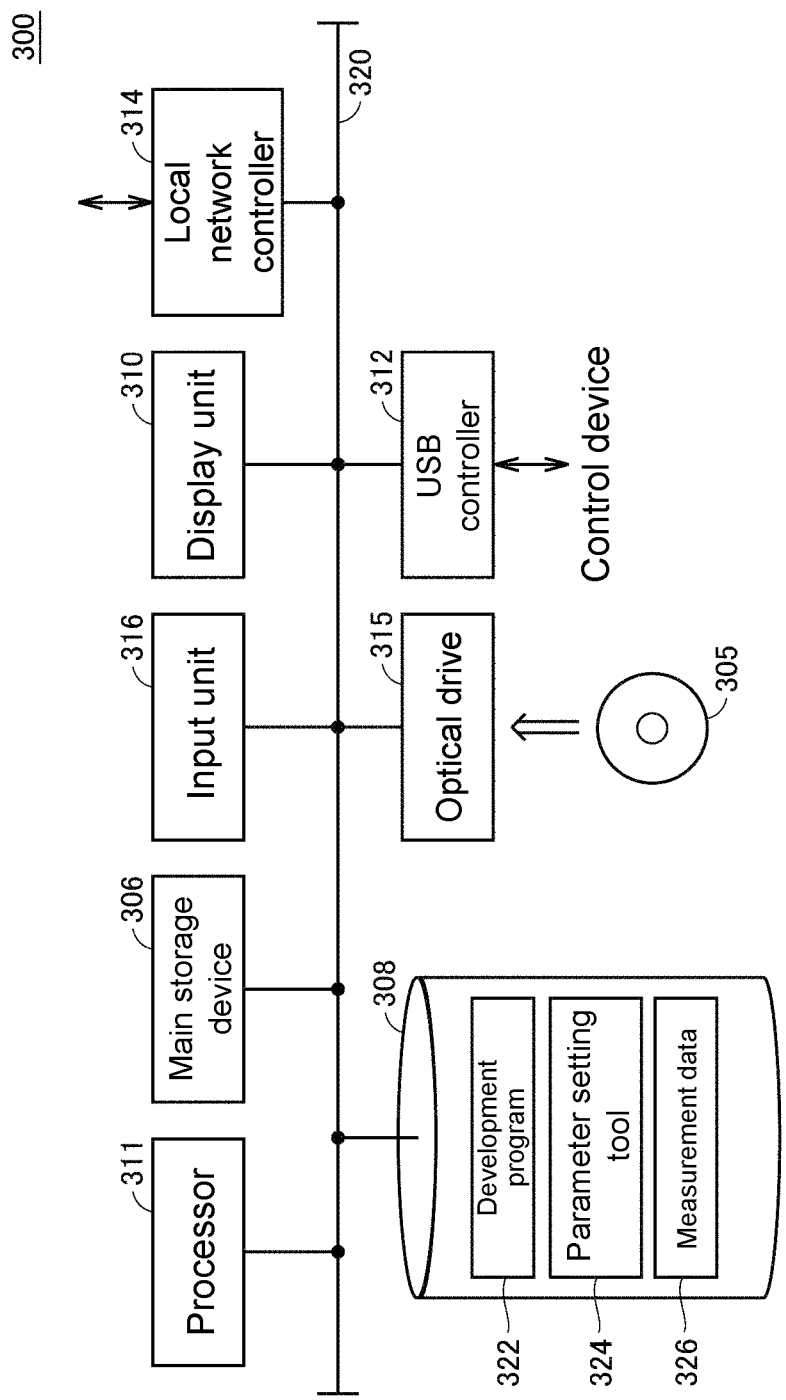
FIG. 14 is a block diagram illustrating a hardware configuration example of a support device included in a control system according to the embodiment.

FIG. 14 is a block diagram illustrating a hardware configuration example of the support device 300 included in a control system according to the embodiment. Referring to FIG. 14, the support device 300 includes a processor 311 such as a CPU or an MPU, an optical drive 315, a main storage device 306, a secondary storage device 308, a display unit 310, a universal serial bus (USB) controller 312, a local network controller 314, an input unit 316, and a display unit 310. These components are connected via a bus 320.

The processor 311 realizes various processes to be described below by reading various programs stored in the secondary storage device 308 and loading and executing the programs on the main storage device 306. The processor 311 generates an image to be displayed on the display unit 310 based on measurement data 326 acquired from the control device 100.

The secondary storage device 308 is configured by, for example, a hard disk drive (HDD), a flash solid state drive (SSD), or the like. The secondary storage device 308 typically includes a development program 322 for performing generation of the user program 124, definition of a system configuration, setting of various parameters, and the like, a parameter setting tool 324 for designating various variables, and the measurement data 326 acquired from the control device 100. The secondary storage device 308 may store an OS and other necessary programs. The support device 300 includes the optical drive 315, and thus a program stored in a recording medium 305 may be read from the recording medium 305 (for example, an optical recording medium such as a digital versatile disc (DVD)) that stores a computer-readable program in a non-transitory manner and may be installed in the secondary storage device 308 or the like.

Various programs executed in the support device 300 may be installed via the computer-readable recording medium 305 or may be installed in a manner in which a program is downloaded from a server device or the like on a network. Functions provided by the support device 300 according to the embodiment are realized in a form in which some of modules supplied by the OS are used in some cases.

The display unit 310 displays at least one of the first image 80 and the second image 90 generated based on the measurement data 326 stored in the secondary storage device 308 by the processor 311.

The USB controller 312 controls exchange of data with the control device 100 via USB connection. The local network controller 314 controls exchange of data with other devices via any network.

The input unit 316 is configured by a keyboard, a mouse, or the like and receives a user operation. The display unit 310 is configured by a display, various indicators, a printer, or the like and outputs a processing result or the like from the processor 311.

FIG. 3 illustrates the configuration example in which necessary functions are provided by causing the processor 311 to execute a program. Some or all of the provided functions may be mounted using a dedicated hardware circuit (for example, an ASIC or an FPGA).

[Process of Selecting Transfer System in Second Embodiment]

Figure 15:
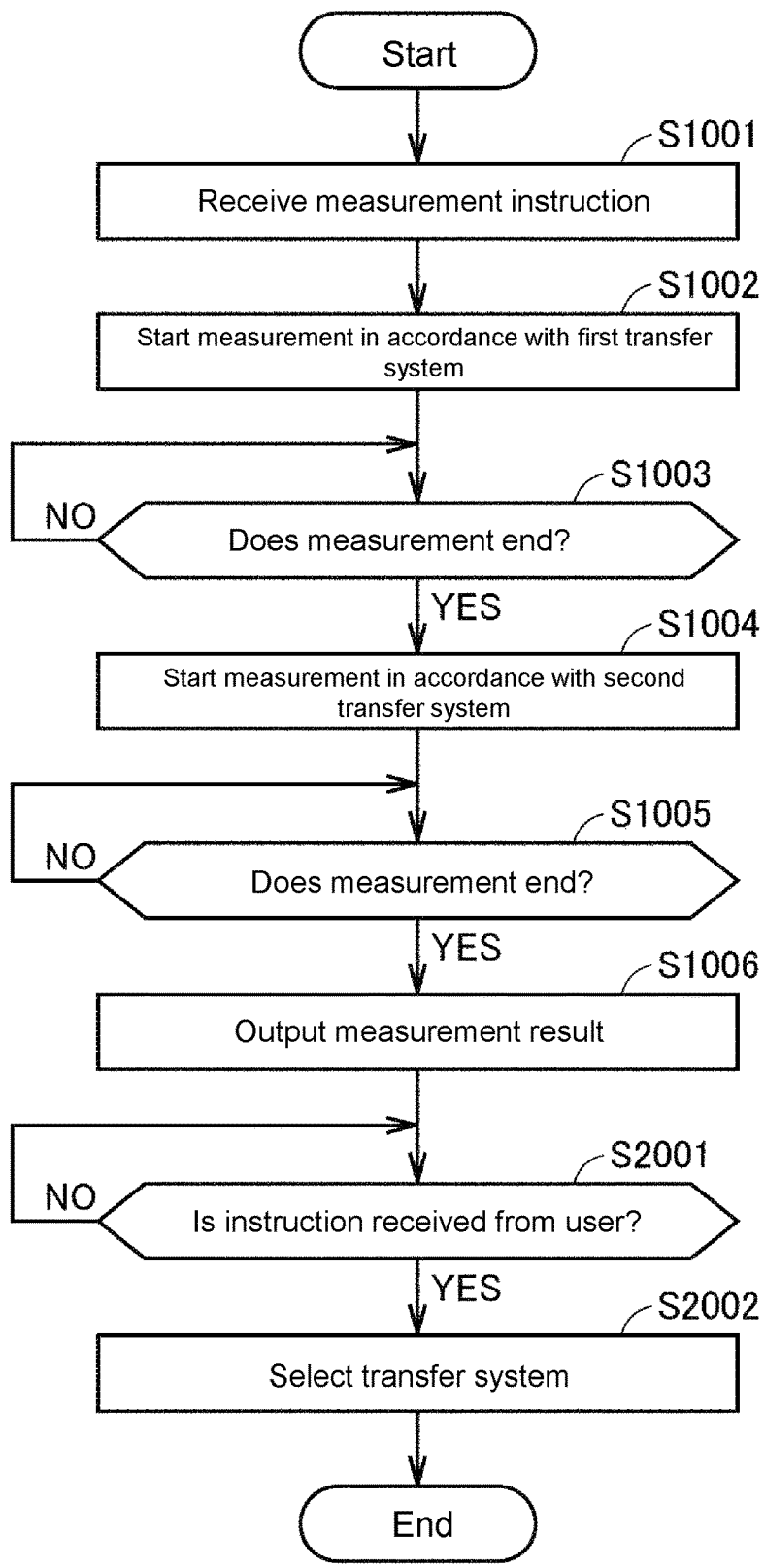
FIG. 15 is a flowchart illustrating a process of causing a computation processing unit to select a transfer system in response to an instruction from a user.

FIG. 15 is a flowchart illustrating a process of causing the computation processing unit 110 to select a transfer system in response to an instruction from a user. In step S1006, the computation processing unit 110 outputs the measurement data including the first transfer time, the second transfer time, the degree of variation in the first transfer time, and the degree of variation in the second transfer time. The computation processing unit 110 outputs the measurement data to the support device 300.

In step S2001, the computation processing unit 110 determines whether an instruction is received from the user from the support device 300. When the computation processing unit 110 determines that the instruction is received from the user (YES in step S2001), the computation processing unit 110 switches the control to step S2002. Otherwise (NO in step S2001), the computation processing unit 110 switches the control to step S1003 and continues the process until an instruction is received from the user. When a predetermined time has passed and the instruction is not received from the user, the computation processing unit 110 ends the process of selecting the transfer system illustrated in FIG. 15.

In step S2002, the computation processing unit 110 selects one transfer system among the plurality of transfer systems in response to the instruction from the user. More specifically, when the instruction from the user is an instruction to select the first transfer system and the presently set transfer system is the second transfer system, the computation processing unit 110 selects the first transfer system. The computation processing unit 110 continues the setting of the present system without selecting a new transfer system when the presently set transfer system is the first transfer system.

Modification Examples

In the first and second embodiments, the configuration examples in which the processor 112 of the computation processing unit 110 executes the program to provide necessary functions have been described. Some or all of the provided functions may be mounted using a dedicated hardware circuit (for example, an ASIC, an FPGA, or the like). Alternatively, the main units of the control device 100 may be realized using hardware (for example, an industrial PC in which a general-purpose PC is a basis) that conforms to a general-purpose architecture. In this case, a plurality of operating systems (OS s) with different purposes may be performed in parallel and applications necessary for each OS may be performed using a virtualization technology.

In the second embodiment, the PLC 1 is configured so that the control device 100, the functional units 200, and the support device 300 are each separately configured, but a configuration in which some or all of the functions are aggregated in a single device may be adopted.

In the second embodiment, as described above, the first image 80 and the second image 90 are separately displayed on the display unit 310, but the first image 80 and the second image 90 may be arranged in parallel and displayed on the display unit 310.

In the second embodiment, various values such as the minimum transfer time, the maximum transfer time, the average transfer time, and the set time described in the first image 80 and the second image 90 are exemplary, and other values may be used.

<Supplements>

The above-described embodiments include the following technical ideas.

[Configuration 1]

A control system including:
one or a plurality of functional units (200); and
a control device (100) configured to exchange communication data (20) transmitted circularly among the one or plurality of functional units (200),
wherein the control device (100) includes
a communication circuit (130) including a first storage unit (132) that temporarily stores the communication data (20),
a second storage unit (114) that stores the communication data (20) transmitted from the first storage unit (132) in accordance with one of a plurality of transfer systems,
a computation processing unit (110) that performs a computation process using the communication data (20) stored in the second storage unit (114), and
a DMA controller (140) connected to the computation processing unit (110) and the communication circuit (130),
wherein the plurality of transfer systems includes a first transfer system in which the computation processing unit (110) transfers the communication data (20) and a second transfer system in which the DMA controller (140) transfers the communication data (20), and wherein the computation processing unit (110) selects one transfer system between the first and second transfer systems in accordance with an instruction from a user or a predetermined condition.

[Configuration 2]

The control system according to Configuration 1, wherein the computation processing unit (110)

measures a first transfer time and a second transfer time, wherein the first transfer time is one between a time in which the communication data (20) is transmitted to the second storage unit (114) in accordance with the first transfer system, and the time in which the communication data (20) is transmitted and a time in which the computation process is performed, and the second transfer time is one between a time in which the communication data is transmitted to the second storage unit (114) in accordance with the second transfer system, and the time in which the communication data is transmitted and the time in which the computation process is performed, and outputs measurement data including the first transfer time and the second transfer time.

[Configuration 3]

The control system according to Configuration 2, wherein the computation processing unit (110) measures the first transfer time and the second transfer time when supply of power to the control device (110) starts or a configuration of the one or plurality of functional units (200) connected to the control device is changed.

[Configuration 4]

The control system according to Configuration 2 or 3, wherein the measurement data includes a first average transfer time for the first transfer time when the communication data (20) is transferred a plurality of times in accordance with the first transfer system and a second average transfer time for the second transfer time when the communication data (20) is transferred a plurality of times in accordance with the second transfer system, and wherein the computation processing unit (110) is able to select a transfer system in which the communication data is transferred for a shorter time between the first transfer system in which the communication data is transferred for the first average transfer time and the second transfer system in which the communication data is transferred for the second average transfer time.

[Configuration 5]

The control system according to Configuration 2 or 3, wherein the measurement data includes a degree of variation in the first transfer time when the communication data (20) is transferred a plurality of times in accordance with the first transfer system and a degree of variation in the second transfer time when the communication data (20) is transferred a plurality of times in accordance with the second transfer system, and wherein the computation processing unit (110) is able to select a transfer system in which the communication data is transferred to a degree of less variation between the first transfer system in which the communication data is transferred to the degree of variation in the first transfer time and the second transfer system in which the communication data is transferred to the degree of variation in the second transfer time.

[Configuration 6]

The control system according to any one of Configurations 2 to 5, further including:

a support device (300) configured to receive the measurement data, wherein the support device (300) includes a display unit that displays an image in which a maximum time allowed for the transfer of the communication data (20) is able to be compared to an actually measured time when the communication data (20) is transferred in accordance with one transfer system between the first and second transfer systems, based on the received measurement data.

[Configuration 7]

A control device that exchanges communication data (20) transmitted circularly among one or a plurality of functional units (200), the control device (100) including:

a communication circuit (130) including a first storage unit (132) that temporarily stores the communication data (20);

a second storage unit (114) configured to store the communication data (20) transmitted from the first storage unit (132) in accordance with one of a plurality of transfer systems;

a computation processing unit (110) configured to perform a computation process using the communication data (20) stored in the second storage unit (114); and a DMA controller (140) connected to the computation processing unit (110) and the communication circuit (130), wherein the plurality of transfer systems includes a first transfer system in which the computation processing unit (110) transfers the communication data (20) and a second transfer system in which the DMA controller (140) transfers the communication data (20), and wherein the computation processing unit (110) selects one transfer system between the first and second transfer systems in accordance with an instruction from a user or a predetermined condition.

The embodiments disclosed here are exemplary from all the viewpoints and should be considered to be limited. The scope of the present invention includes not only the above description and but also equivalent meanings of the claim scope described in the claims and all the changes within the scope.

The invention claimed is:

1. A control system comprising:

one or a plurality of functional units; and a control device configured to exchange communication data transmitted circularly among the one or plurality of functional units, wherein the control device includes a communication circuit including a first storage unit that temporarily stores the communication data, a second storage unit that stores the communication data transmitted from the first storage unit in accordance with one of a plurality of transfer systems, a computation processing unit that performs a computation process using the communication data stored in the second storage unit, and a DMA controller connected to the computation processing unit and the communication circuit, wherein the plurality of transfer systems includes a first transfer system in which the computation processing unit transfers the communication data and a second transfer system in which the DMA controller transfers the communication data, and wherein the computation processing unit selects one transfer system between the first and second transfer systems in accordance with an instruction from a user or a predetermined condition, wherein the computation processing unit measures a first transfer time and a second transfer time, wherein the first transfer time is one between a time in which the communication data is transmitted to the second storage unit in accordance with the first transfer system, and the time in which the communication data is transmitted and a time in which the computation process is performed, and the second transfer time is one between a time in which the communication data is transmitted to the second storage unit in accordance with the second transfer system, and the time in which the communication data is transmitted and the time in which the computation process is performed, and outputs measurement data including the first transfer time and the second transfer time.

2. The control system according to claim 1, wherein the computation processing unit measures the first transfer time and the second transfer time when supply of power to the control device starts or a configuration of the one or plurality of functional units connected to the control device is changed.

3. The control system according to claim 1, wherein the measurement data includes a first average transfer time for the first transfer time when the communication data is transferred a plurality of times in accordance with the first transfer system and a second average transfer time for the second transfer time when the communication data is transferred a plurality of times in accordance with the second transfer system, and wherein the computation processing unit is able to select a transfer system in which the communication data is transferred for a shorter time between the first transfer system in which the communication data is transferred for the first average transfer time and the second transfer system in which the communication data is transferred for the second average transfer time.

4. The control system according to claim 1, wherein the measurement data includes a degree of variation in the first transfer time when the communication data is transferred a plurality of times in accordance with the first transfer system and a degree of variation in the second transfer time when the communication data is transferred a plurality of times in accordance with the second transfer system, and wherein the computation processing unit is able to select a transfer system in which the communication data is transferred to a degree of less variation between the first transfer system in which the communication data is transferred to the degree of variation in the first transfer time and the second transfer system in which the communication data is transferred to the degree of variation in the second transfer time.

5. The control system according to claim 1, further comprising:

a support device configured to receive the measurement data, wherein the support device includes a display unit that displays an image in which a maximum time allowed for the transfer of the communication data is able to be compared to an actually measured time when the communication data is transferred in accordance with one transfer system between the first and second transfer systems, based on the received measurement data.

6. A control device that exchanges communication data transmitted circularly among one or a plurality of functional units, the control device comprising:
a communication circuit including a first storage unit that temporarily stores the communication data;
a second storage unit configured to store the communication data transmitted from the first storage unit in accordance with one of a plurality of transfer systems;
a computation processing unit configured to perform a computation process using the communication data stored in the second storage unit; and
a DMA controller connected to the computation processing unit and the communication circuit,
wherein the plurality of transfer systems includes a first transfer system in which the computation processing unit transfers the communication data and a second transfer system in which the DMA controller transfers the communication data, and
wherein the computation processing unit selects one transfer system between the first and second transfer systems in accordance with an instruction from a user or a predetermined condition,
wherein the computation processing unit measures a first transfer time and a second transfer time, wherein the first transfer time is one between a time in which the communication data is transmitted to the second storage unit in accordance with the first transfer system, and the time in which the communication data is transmitted and a time in which the computation process is performed, and the second transfer time is one between a time in which the communication data is transmitted to the second storage unit in accordance with the second transfer system, and the time in which the communication data is transmitted and the time in which the computation process is performed, and
outputs measurement data including the first transfer time and the second transfer time.

7. The control system according to claim 2,
wherein the measurement data includes a first average transfer time for the first transfer time when the communication data is transferred a plurality of times in accordance with the first transfer system and a second average transfer time for the second transfer time when the communication data is transferred a plurality of times in accordance with the second transfer system, and
wherein the computation processing unit is able to select a transfer system in which the communication data is transferred for a shorter time between the first transfer system in which the communication data is transferred for the first average transfer time and the second transfer system in which the communication data is transferred for the second average transfer time.

8. The control system according to claim 2,
wherein the measurement data includes a degree of variation in the first transfer time when the communication data is transferred a plurality of times in accordance with the first transfer system and a degree of variation in the second transfer time when the communication data is transferred a plurality of times in accordance with the second transfer system, and
wherein the computation processing unit is able to select a transfer system in which the communication data is transferred to a degree of less variation between the first transfer system in which the communication data is transferred to the degree of variation in the first transfer time and the second transfer system in which the communication data is transferred to the degree of variation in the second transfer time.

9. The control system according to claim 2, further comprising:
a support device configured to receive the measurement data,
wherein the support device includes a display unit that displays an image in which a maximum time allowed for the transfer of the communication data is able to be compared to an actually measured time when the communication data is transferred in accordance with one transfer system between the first and second transfer systems, based on the received measurement data.

10. The control system according to claim 3, further comprising:
a support device configured to receive the measurement data,
wherein the support device includes a display unit that displays an image in which a maximum time allowed for the transfer of the communication data is able to be compared to an actually measured time when the communication data is transferred in accordance with one transfer system between the first and second transfer systems, based on the received measurement data.

11. The control system according to claim 4, further comprising:
a support device configured to receive the measurement data,
wherein the support device includes a display unit that displays an image in which a maximum time allowed for the transfer of the communication data is able to be compared to an actually measured time when the communication data is transferred in accordance with one transfer system between the first and second transfer systems, based on the received measurement data.

12. The control system according to claim 7, further comprising:
a support device configured to receive the measurement data,
wherein the support device includes a display unit that displays an image in which a maximum time allowed for the transfer of the communication data is able to be compared to an actually measured time when the communication data is transferred in accordance with one transfer system between the first and second transfer systems, based on the received measurement data.

13. The control system according to claim 8, further comprising:
a support device configured to receive the measurement data,
wherein the support device includes a display unit that displays an image in which a maximum time allowed for the transfer of the communication data is able to be compared to an actually measured time when the communication data is transferred in accordance with one transfer system between the first and second transfer systems, based on the received measurement data.

* * * * *